United States Patent
Wood et al.

(10) Patent No.: US 11,752,949 B2
(45) Date of Patent: Sep. 12, 2023

(54) MOUNTING SYSTEM FOR SECURING ITEMS TO A SPARE TIRE

(71) Applicant: A Wood Products LLC, Poway, CA (US)

(72) Inventors: Adam Wood, Poway, CA (US); Kevin Klemmt, Seattle, WA (US); Louis W. Dawson, III, North Bend, WA (US)

(73) Assignee: A Wood Products LLC, Poway, CA (US)

( * ) Notice: Subject to any disclaimer, the term of this patent is extended or adjusted under 35 U.S.C. 154(b) by 155 days.

(21) Appl. No.: 17/518,518

(22) Filed: Nov. 3, 2021

(65) Prior Publication Data

US 2023/0137575 A1    May 4, 2023

(51) Int. Cl.
  *B60R 11/00*    (2006.01)
  *B60R 9/06*    (2006.01)
(52) U.S. Cl.
  CPC ............ *B60R 11/00* (2013.01); *B60R 9/06* (2013.01); *B60R 2011/0059* (2013.01)
(58) Field of Classification Search
  CPC ........... B60C 27/10; B60C 27/12; B60R 9/06
  USPC ........... 152/218, 219, 208, 221, 222; 63/5.1; D8/354
  See application file for complete search history.

(56) References Cited

U.S. PATENT DOCUMENTS

| | | | | |
|---|---|---|---|---|
| 2,931,413 A | * | 4/1960 | Randall | B60C 27/10 152/219 |
| 4,132,336 A | * | 1/1979 | Leinaar | B62D 43/02 224/570 |
| 4,146,076 A | * | 3/1979 | Matsui | B60C 27/16 152/231 |
| 4,187,894 A | * | 2/1980 | Peterson | B60C 27/16 152/222 |

(Continued)

FOREIGN PATENT DOCUMENTS

| | | |
|---|---|---|
| CN | 205769657 U | 12/2016 |
| FR | 3086919 A1 | 4/2020 |

OTHER PUBLICATIONS

Rotopax Spare Tire Mount with Strap (TNT Customs); https://www.tntcustoms.com/jeep_parts/rotopax_spare_tire_mount_strap; 7 pages.

(Continued)

*Primary Examiner* — Justin M Larson
(74) *Attorney, Agent, or Firm* — Lowe Graham Jones PLLC

(57) ABSTRACT

Mounting blocks for securing items to a tire are secured by a tensioner wrapped around the tire and mounting blocks. Tensioning blocks maintain tension in the tensioner. The tensioner may be a pair of cables passing through grooves in the mounting blocks. The mounting blocks may define recesses over which the cable passes. Straps may pass around the cable in a recess to secure a pouch over a center of the tire. The cables may include widened portions that fit within widened portions of slots defined in the tensioning (Continued)

blocks. The mounting blocks and tensioning blocks may be identical but used differently. The mounting blocks may define openings for receiving straps securing items to the mounting blocks. Straps may be used in the place of cables and a pouch secured to the mounting blocks using other structures on the mounting blocks.

27 Claims, 20 Drawing Sheets

(56) References Cited

U.S. PATENT DOCUMENTS

| | | | | |
|---|---|---|---|---|
| 4,271,887 A | * | 6/1981 | Holzwarth | B60C 27/22 152/224 |
| 4,508,151 A | * | 4/1985 | Sepheriades | B60C 27/16 24/68 TT |
| 4,749,015 A | * | 6/1988 | Miyagawa | B60C 27/16 152/218 |
| 4,889,172 A | * | 12/1989 | Zeiser | B60C 27/16 152/244 |
| 4,911,343 A | | 3/1990 | Lords et al. | |
| 5,085,360 A | * | 2/1992 | Fortune | B60R 9/10 224/42.21 |
| 5,203,479 A | * | 4/1993 | Lucas | B62D 43/02 296/37.6 |
| 5,228,608 A | | 7/1993 | Stout, III | |
| D376,996 S | * | 12/1996 | Soucy | D12/7 |
| 5,803,324 A | | 9/1998 | Silberman et al. | |
| 8,061,160 B2 | * | 11/2011 | Stinespring | A41F 15/002 59/80 |
| 8,141,605 B2 | * | 3/2012 | Park | B60C 27/22 301/41.1 |
| 8,627,865 B2 | * | 1/2014 | Park | B60C 27/22 152/200 |
| 8,708,012 B2 | * | 4/2014 | Jourdan | B60C 27/061 152/218 |
| 9,409,456 B1 | * | 8/2016 | Mariansky | B60C 27/062 |
| D904,859 S | * | 12/2020 | Mulvoy | D8/354 |
| 10,894,514 B2 | * | 1/2021 | Williams | B60R 9/10 |
| D970,329 S | * | 11/2022 | Rajkovic | D8/354 |
| 2006/0144493 A1 | * | 7/2006 | Kaufman | B60C 27/20 152/225 R |
| 2009/0038724 A1 | * | 2/2009 | Roussos | B60C 27/20 152/219 |
| 2010/0163147 A1 | * | 7/2010 | Park | B60C 27/22 152/219 |
| 2019/0135056 A1 | * | 5/2019 | Martin | B60C 27/10 |

OTHER PUBLICATIONS

Bestop RoughRider Spare Tire Organizer; https://www.quadratec.com/products/14114_011X_PG.htm; 6 pages.

* cited by examiner

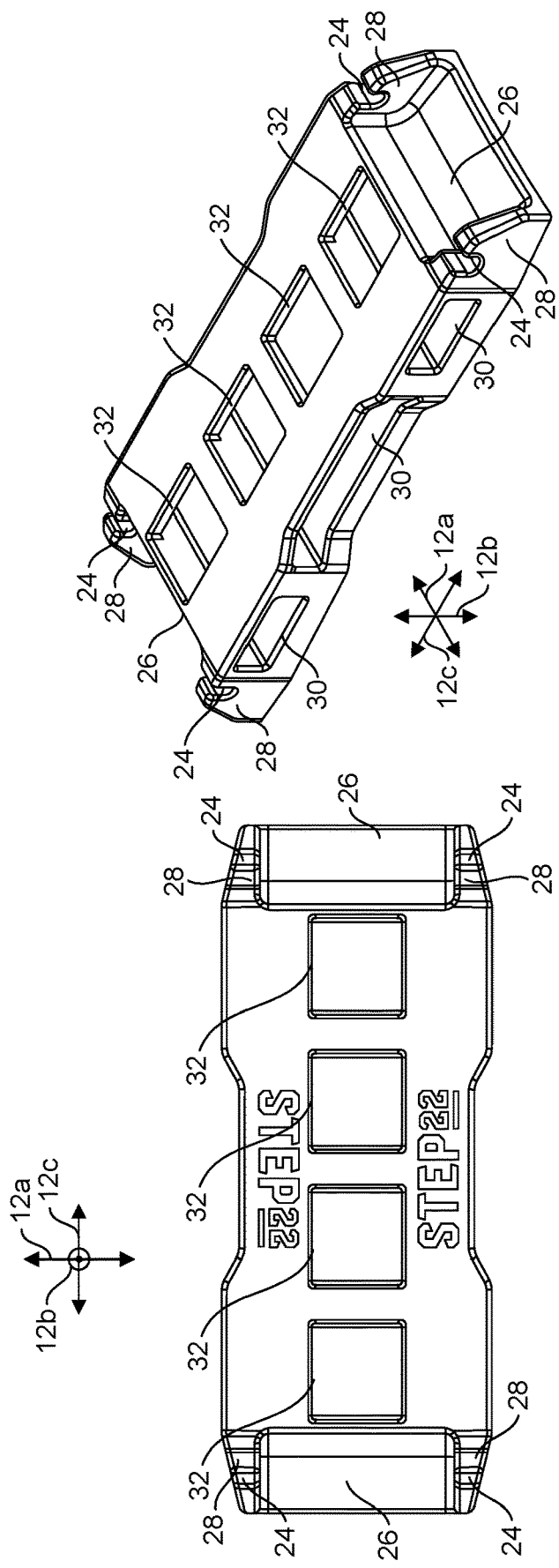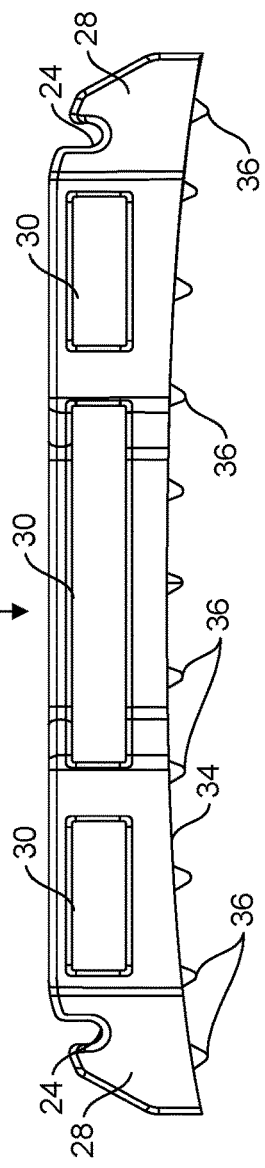

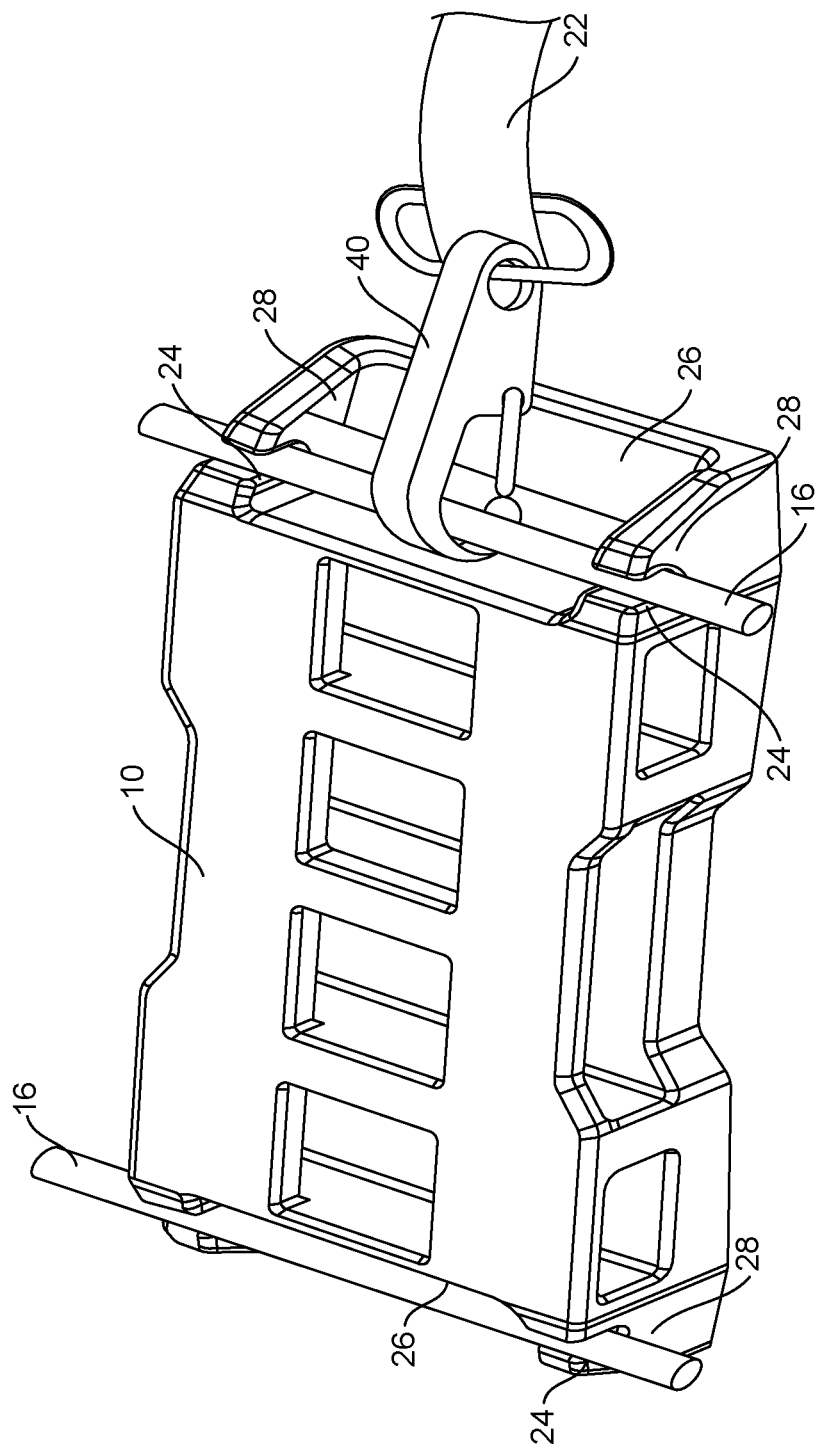

MOUNTING SYSTEM FOR SECURING ITEMS TO A SPARE TIRE

FIELD OF THE INVENTION

This application relates to structures for securing storage to the exterior of a vehicle and, more particularly, to structures for securing storage to an external spare tire of a vehicle.

BACKGROUND OF THE INVENTION

Overlanding is the practice of traveling over long distances and for extended periods in a vehicle in remote areas. Participants must therefore provide for all their needs during an excursion. To increase the available storage capacity of a vehicle, some items may be fastened to the exterior of the vehicle, such as to a storage rack on the roof. Fastening on the exterior of the vehicle may aid in placing items in convenient locations for use and may also locate smelly or dirty items outside to avoid soiling the vehicle interior. The storage and accessibility issues also apply to other vehicle uses beyond overlanding.

It would be an advantage to provide additional options for external securement of items to a vehicle.

SUMMARY OF THE INVENTION

In one aspect of the invention, an apparatus for securing one or more items to a tire includes one or more tensioners configured to wrap around a major portion of the tire. The apparatus may include a first tensioning block configured to secure to the one or more tensioners and a second tensioning block configured to secure to the one or more tensioners. A tensioning system couples the first tensioning block to the second tensioning block and is configured to adjust a separation between the first tensioning block and the second tensioning block. The apparatus may include one or more mounting blocks including one or more guides for receiving a portion of each of the one or more tensioners. The one or more mounting blocks may define one or more openings for fastening the one or more items to the one or more mounting blocks.

The first tensioning block may be configured to be removably secured to the one or more tensioners including one or more cables by engaging a first widened portion secured to each cable of the one or more cables. The second tensioning block may be non-removably secured to a second widened portion secured to each cable of the one or more cables.

In some embodiments, the one or more tensioners include two tensioners. The one or more guides of each mounting block of the one or more mounting blocks may each include two guides offset from one another in each mounting block and each configured to engage one of the two tensioners. Each guide of the two guides may include one or more grooves defined in each mounting block of the one or more mounting blocks. The two guides may be offset from one another in a first direction. Each guide of the two guides may include two ribs offset from one another in a second direction perpendicular to the first direction, each rib of the two ribs defining a groove of the one or more grooves.

In some embodiments, at least one guide of the two guides includes a recess between the two ribs of the at least one guide such that when a first cable of the one or more cables is positioned within the two guides, a portion of the first cable is suspended within the recesses such that at least one of a strap and a clip is fastenable to the portion of the first cable. The portion of the first cable may be covered with a sleeve or other structure to prevent abrasion and facilitate securement to the strap or clip.

In some embodiments, the tensioning system includes a nut captured within the first tensioning block and rotatable with respect to the first tensioning block and a threaded shaft secured to the second tensioning block and engaging the nut. The threaded shaft may be secured to the second tensioning block by an indicator such that change in tension in the threaded shaft causes a visual change in state of the indicator.

In some embodiments, each of the first tensioning block, the second tensioning block, and one or more mounting blocks has a same design. The same design may include one or more grooves for receiving the one or more tensioners such that the one or more tensioners are slidable along the one or more grooves. The same design may include one or more first structures for fastening to the one or more tensioners in addition to the one or more grooves. The same design may include one or more second structures for capturing a nut and resist rotation of the nut. The same design may include one or more third structures for rotatably retaining a threaded shaft engaging the nut.

In some embodiments, a lower surface of each of the one or more mounting blocks, the first tensioning block, and the second tensioning block is curved to conform to the tire. In some embodiments, a lower surface of each of the one or more mounting blocks, the first tensioning block has one or more spikes secured thereto for engaging the tire.

In another aspect of the invention, an apparatus includes a mounting block defining one or more first grooves. The mounting block may define one or more second grooves offset from the first groove in a first direction. The one or more first grooves may be configured to receive a first tensioner and the one or more second grooves may be configured to receive a second tensioner. The mounting block may define one or more attachment points defined between the one or more first grooves and one or more second grooves. The attachment points may be configured to secure an item to the mounting block.

In some embodiments, the mounting block further defines a first slot including one or more first widened portions, the slot being substantially parallel to the one or more first grooves. The mounting block may define a second slot including one or more second widened portions, the second slot being substantially parallel to the first slot. The first slot and second slot may be positioned between the first one or more grooves and the second one or more grooves.

In some embodiments, the mounting block further defines one or more through openings extending therethrough in a second direction perpendicular to the first direction. The mounting block may define one or more cavities, each cavity of the one or more cavities being sized to receive a barrel nut and being intersected by one of the one or more through openings.

The one or more attachment points may include one or more first openings passing through the mounting block in a second direction perpendicular to the first direction. The mounting block may define one or more top openings each extending from an upper surface of the mounting block to one of the one or more first openings. A lower surface of the mounting block may be curved to conform to a tire and defines a plurality of spikes.

In another aspect of the invention, a method includes securing a plurality of mounting blocks around a tread of a tire with a tensioner extending around the tire with the plurality of mounting blocks being positioned between the tensioner and the tire. An item to be secured to the strap is secured to a plurality of straps. Each strap of the plurality of straps may be secured to the tensioner such that each strap engages a portion of the tensioner passing over a mounting block of the plurality of mounting blocks.

In some embodiments, each mounting block of the plurality of mounting blocks defines a pair of ribs each defining a groove and a recess between the pair of ribs. Securing each strap of the plurality of straps to the tensioner may include securing each strap between the pair of ribs of one of the mounting blocks of the plurality of mounting blocks.

BRIEF DESCRIPTION OF THE DRAWINGS

Preferred and alternative examples of the present invention are described in detail below with reference to the following drawings:

FIG. 2A is a top view of a first embodiment of a mounting block in accordance with an embodiment of the present invention;

FIG. 2B is an isometric view of the mounting block of FIG. 2A;

FIG. 2C is a side view of the mounting block of FIG. 2A;

FIG. 3B is an isometric view of the mounting block of FIG. 2A having a strap of a center pouch secured thereto with a clip in accordance with an embodiment of the present invention;

DETAILED DESCRIPTION OF THE PREFERRED EMBODIMENTS

Figure 1:
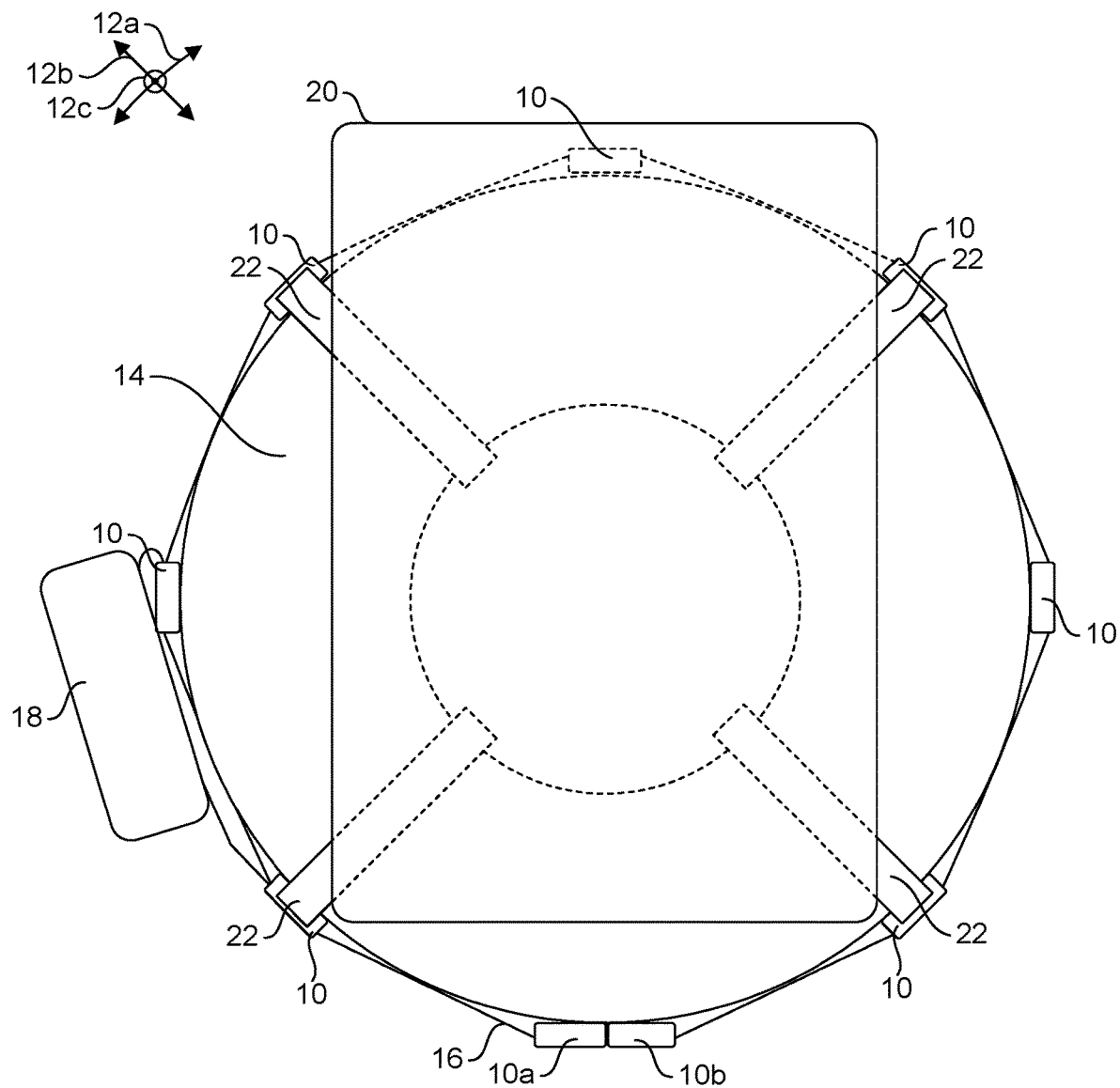
FIG. 1 is a rear elevational view of a tire having mounting blocks and storage secured thereto in accordance with an embodiment of the present invention.

Referring to FIG. 1, mounting blocks 10, according to the embodiments disclosed herein, may be understood with respect to a circumferential direction 12a corresponding to a circular dimension about the axis of rotation of the tire 14 with which the mounting plates 10 are used and a direction of movement of a point on the tread of the tire 14 about the axis of rotation of the tire 14. A radial direction 12b may be defined as a dimension or movement that is along a line intersecting an axis of rotation of the tire 14. A longitudinal direction 12c may be defined as a dimension or movement parallel to the axis of rotation of the tire 14 (perpendicular to the page in FIG. 1).

The mounting blocks 10 may be held in place by a tensioner 16 passing around the tire 14 in the circumferential direction 12a. At least a portion of each mounting block 10 is positioned between the tensioner 16 and the tire 14 along the radial direction 12b such that tension in the tensioner 16 secures the mounting plates 10 to the tire 14. The tensioner 16 may be a cable, e.g., braded steel cable, strap, rope, or other type of cordage. In some embodiments, the tensioner 16 is embodied as two or more tensioners 16.

Perimeter pouches 18 may secure to the mounting blocks 10 or the tensioner 16. Perimeter pouches 18 may be positioned outwardly from the mounting blocks 10 such that the mounting blocks 10 are positioned between the perimeter pouches 18 and the tire 14 in the radial direction 12b.

A center pouch 20 may be completely or partially positioned inwardly from the tread of the tire 14 along the radial direction 12b. All or part of the center pouch 20 may also be positioned inwardly from the mounting blocks 10 along the radial direction 12b. In some embodiments, at least part of the center pouch 20 is intersected by the axis of rotation of the tire 14. Center pouch 20 does not need to be "centered on the tire 14, but at least a portion of center pouch 20 may be positioned anywhere on the back side of the tire 14.

The center pouch 20 may be secured to a plurality of straps 22 that extend outwardly from the center pouch 20 generally along (e.g., within 15 degrees of) the radial direction 12b and secure to tensioner 16 or blocks 10. In the illustrated embodiment, the straps 22 secure to portions of the tensioner 16 extending over the mounting blocks 10. In other embodiments, the straps 22 secure directly to the mounting blocks 10 rather than to the tensioner 16. Also note that in the illustrated embodiment, some of the mounting blocks 10 do not have straps 22 secured thereto.

The straps 22 may secure to locations distributed around the tensioner 16 such that there are at least three straps 22 with an angular separation between points of attachment to the tensioner 16 equal to at least 80 percent of 360/N, where N is the number of straps 22 and angular separation is measured about the axis of rotation of the tire 14. In a like manner, the straps 22 may be secured to the center pouch 20 such there is a center point on the center pouch 20 such that the points at which the straps 22 emanate from points of attachment to the center pouch 20 are distributed angularly around the center point such that the angular separation between these points of attachment to the tensioner 16 is also equal to at least 80 percent of 360/N. In other embodiments, only two straps are used applying tension directly opposite one another, the two straps being tensioned sufficient to support the center pouch 20 and a load contained therein.

The mounting blocks 10 may include or be used with tensioning blocks 10a, 10b that are secured to the tensioner 16 and may be drawn together in order to adjust the tension of the tensioner 16. Various embodiments of the tensioning blocks 10a, 10b are described below. The tensioner 16 may also be tensioned directly, such as by using a turnbuckle, ratcheting lever, or any other cable or strap tensioning approach known in the art.

FIGS. 2A, 2B, and 2C illustrate an example implementation of a mounting block 10. In the illustrated embodiment, the mounting block 10 includes cable guides 24, such as cable guides 24 on either end of the mounting plate 20 and offset from one another along the longitudinal direction 12c. Accordingly, two tensioners 16 may be used, one tensioner 16 engaging cable guides 24 on one side (e.g., closer to the vehicle to which the tire 14 is mounted) of the mounting block 10 and a second tensioner 16 engaging cable guides 24 on the other side (farther from the vehicle). In the illustrated embodiment, upper ends of the cable guides 24 define openings allowing tensioners 16 to be laid into the cable guides 24 rather than being threaded through the cable guides 24. The openings of the cable guides 24 may face outwardly from the mounting block 10 along the radial direction 12b during use.

In the illustrated embodiment, there are two pairs of guides 24, one pair on each side of the mounting block 10 defining a recess 26 between them such that a portion of the tensioner 16 passing through a pair of cable guides 24 will extend into the recess 26. The recess 26 may provide space for attachment of the straps 22 to the tensioner 16. In the illustrated embodiment, the mounting block 10 defines ribs 28 including sides that are substantially (e.g., within 15 degrees of) parallel to the longitudinal direction 12c and radial direction 12b and the recess 26 is a space between these ribs 28. The cable guides 24 may each be embodied as a notch formed in one of the ribs 28.

The bulk of the mounting block 10 between the guides 24 may include one or more structures for securing perimeter pouches 18 to the mounting block 10. For example, there may be slots 30 passing through the mounting block 10 parallel to, or tangent to, the circumferential direction 12a. The slots 30 may have straight sides that are oriented substantially (e.g., within 15 degrees of) tangent to the circumferential direction 12a during use. In the illustrated embodiment, the slots 30 have rectangular cross-sections in planes perpendicular to a line tangent to the circumferential direction 12a.

In some embodiments, additional openings 32 may be defined in an upper surface of the mounting block 10. The openings 32 may extend through the mounting block 10 such that they intersect the openings 30. As is apparent in the embodiment of FIG. 2B, each opening 30 has at least one opening 32 over it and intersecting it in the illustrated embodiment. In the illustrated embodiment, the central opening 30 is wider in the longitudinal direction 12c than the lateral openings 30 and may have two or more openings 32 intersecting the central opening 30.

The openings 30 may serve one purpose or multiple purposes. In some embodiments, the openings 30 are used exclusively to fasten perimeter pouches 18 to the mounting block 10. The openings 32 may likewise be used for this purpose. In other embodiments, the openings 30 provide an alternative structure for engaging a tensioner 16. For example, if a user desires to use a strap, such as a ratchet strap, rather than cables for the tensioner 16, the strap may be passed through an opening 30 in each mounting block 10 and tensioned around the tread (circumference) of the tire 14 to secure the mounting blocks 10 to the tire 14. In the illustrated embodiment, the central opening 30 is wider and may be particularly suited for this second purpose.

As shown in FIG. 2C, the lower surface 34 of the mounting block 10 may be curved to conform to the tire 14 with which it is used. The upper surface of the mounting block 10 opposite the lower surface 34 may likewise be curved but is planar in the illustrated embodiment. In the illustrated embodiment, the lower surface 34 is curved in planes parallel to the radial direction 12b and longitudinal direction 12c. The lower surface 34 may also be curved in a plane such that the circumferential direction 12a lies in the plane and the plane is also parallel to the radial direction 12b in order to conform to the round circumference of the tire. In other embodiments, the lower surface 34 is flat and the force exerted by the tensioners 16 may elastically or inelastically deform the mounting block 10 to at least partially conform to curvature of the tire 14 with which it is used.

The lower surface 34 may have one or more gripping features extending outwardly therefrom to reduce sliding of the mounting block 10 relative to the tire 14. In the illustrated embodiment, this includes conical, pyramidal, or other-shaped spikes 36 distributed over the lower surface 34, such as in a two-dimensional array of spikes 36. The spikes 36 may locally deform the tire 14 or insert within features in the tread of the tire during use and improve grip.

The mounting block 10 may be formed of a semi-rigid or rigid polymer, metal, or composite material (e.g., fiberglass, Kevlar, or carbon fiber composite). In a typical application, the mounting block 10 is made of a material that is more rigid than the tire 14 with which it is used, such as greater than Shore 80A. For example, the material may have a hardness of at least Rockwell R90 to R130 (e.g., Polyacrylonitrile-butadiene-styrene (ABS) or Polyvinylchloride (PVC)).

Figure 3A:
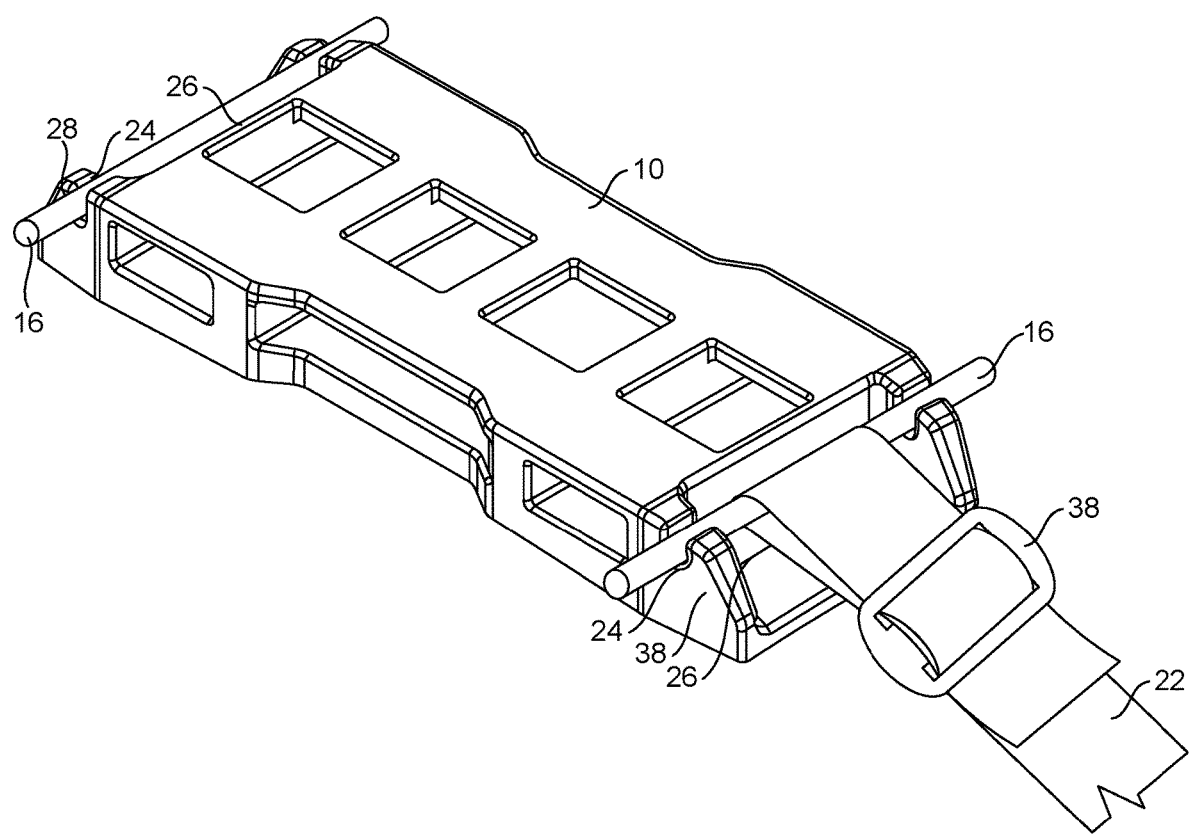
FIG. 3A is an isometric view of the mounting block of FIG. 2A having a strap of a center pouch secured thereto in accordance with an embodiment of the present invention.

Referring to FIG. 3A, in some embodiments, the straps 22 secured to the center pouch 20 secure to the tensioner 16 within the recess 26 by passing around the tensioner 16 and securing back to the strap 22 itself. In the illustrated embodiment, this includes the use of a fastener 38 in the form of a buckle, side release buckle, hook-and-loop fasteners (e.g., VELCRO), or any other type of fastener known in the art. Referring to FIG. 3B, in other embodiments, a clip 40 is secured to the strap 22 and is securable to the tensioner 16. The clip 40 may be embodied as a carabiner or any other type of clip. Other fastening systems known in the art for securing straps to structures may also be used to secure the strap 22 to the tensioner 16.

As noted above, the tensioner 16 embodied as a cable passing through the cable guides 24 may be omitted in favor of one or more straps passing through one of the openings 30. In such uses, the tensioner 16 may be substituted for a bar that fastens within the cable guides 24 in order to provide a structure to which the strap 22 may secure.

Figure 4:
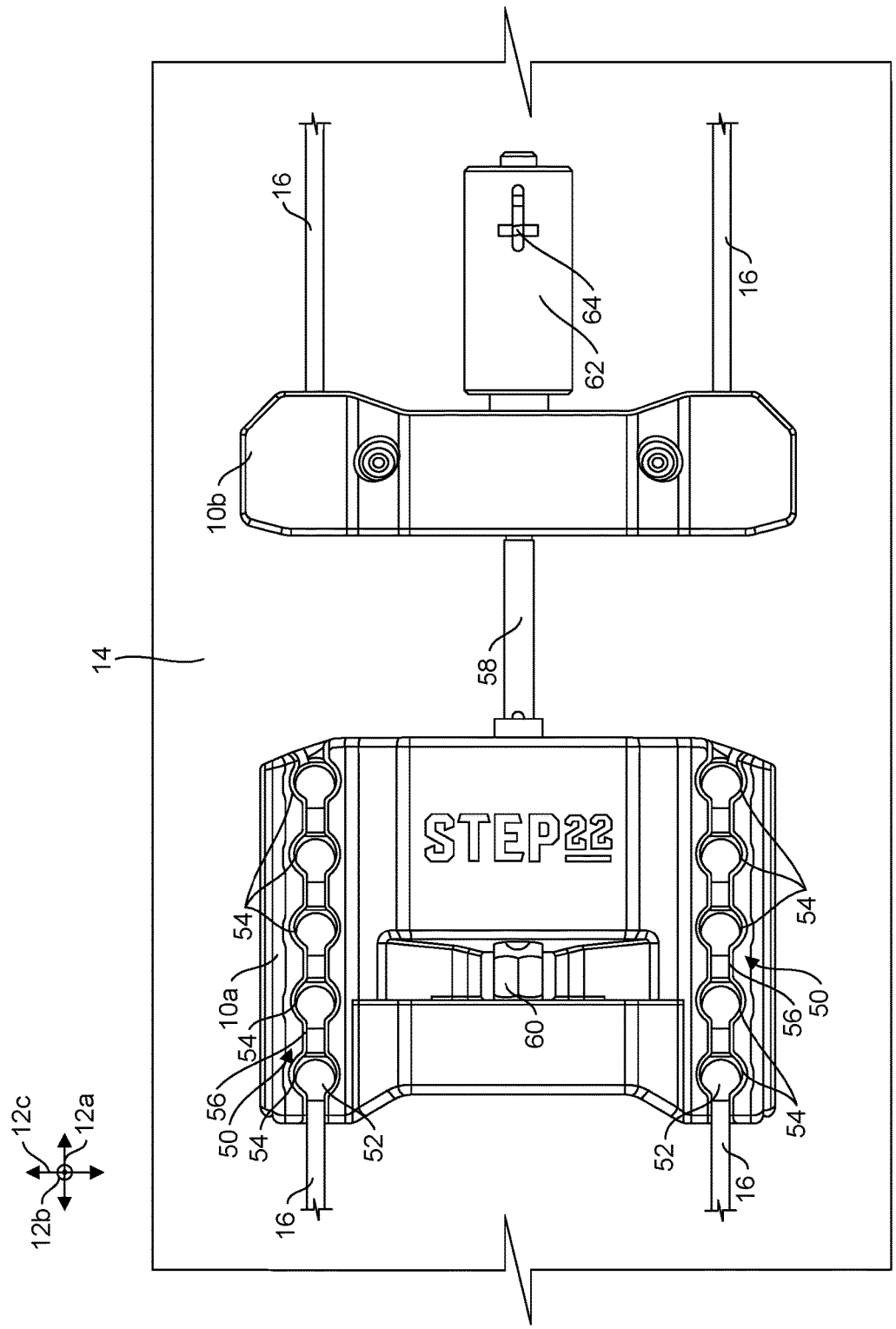
FIG. 4 is a top view of tensioning blocks for securing mounting blocks to a tire in accordance with an embodiment of the present invention.

FIG. 4 illustrates example implementations of the tensioning blocks 10a, 10b. Tensioning block 10a may include one or more attachment points 50 for securing to one end of one or more tensioners 16. In the illustrated embodiment, each tensioner has secured thereto one or more balls 52, blocks, or other structure providing a local change in width of the tensioner 16, either widening or narrowing. For example, the balls 52 may be embodied as beads secured to a tensioner embodied as a steel cable 16 by means of swaging, welding, or other attachment. The attachment points 50 may include a series of widened portions 54 along a central slot 56 such that the ball 52 of each tensioner may be inserted within one of the widened portions 54 in order to be restrained against movement due to circumferential tension on the tensioner 16. A single widened portion 54 along a central slot 56 may also be used. As is apparent, in embodiments where the balls 52 are used, the widened portions 54 may be rounded and sized to receive the balls 52 with the slot 56 being smaller than the diameter of the balls 52. The sides of the slot 56, i.e. long dimension of the slot along which the tensioner 16 extends may be substantially (e.g., within 5 degrees of) parallel to the circumferential direction 12a with the widened portions 54 extending outwardly from the slot 56 in the longitudinal direction 12c.

The other end of each tensioner 16 may be secured to the other tensioning block 10b. In the illustrated embodiment, the tensioner 16 is non-removably secured to tensioning block 10b, e.g., is not removable without the use of tools. However, removable securement may also be used, such as using the ball 52, widened portion 54, and slot 56 used for the tensioning block 10a.

In the illustrated embodiment, a tensioning rod 58 is secured to the tensioning block 10b. A nut 60 is captured within the tensioning block 10a such that the nut 60 is allowed to rotate relative to the tensioning block 10a but is not allowed to slide along the circumferential direction 12a relative to the tensioning block 10a by more than a specified tolerance, e.g., less than 2 mm.

The nut 60 engages the tensioning rod 58 such that turning of the nut 60 draws the tensioning rod 58 and the tensioning block 10b toward the tensioning block 10a. For example, the tensioning rod 58 may be fixed to the tensioning block 10b such that rotation relative to the tensioning block 10b is not permitted other than some small tolerance, e.g., less than 5 degrees. The tensioning rod 58 may include a threaded portion engaging the nut 60. Alternatively, the nut 60 may be fixed relative to the tensioning rod 58, e.g., a hex bolt head, and a threaded portion of the tensioning rod 58 may engage a threaded portion, e.g., nut, fixed relative to the tensioning block 10a (e.g., rotation and sliding in the circumferential direction 12a prevented other than small tolerances referenced above).

In the illustrated embodiment, the tensioning rod 58 passes through the tensioning block 10b and is slidable relative to the tensioning block 10b tangent to the circumferential direction 12a by an amount sufficient to tension the tensioner 16, e.g. at least 1 to 5 cm. The tensioning rod 58 may engage an indicator block 62 including a visual indicator 64 such that the visual indicator 64 changes in response to tensioning of the tensioning rod 58, e.g., changes from red to green when the tension on the tensioning rod 58 reaches a predefined minimum tension. In other embodiments, the functions of the indicator block are integrated into the tensioning block 10b.

Figure 5A:
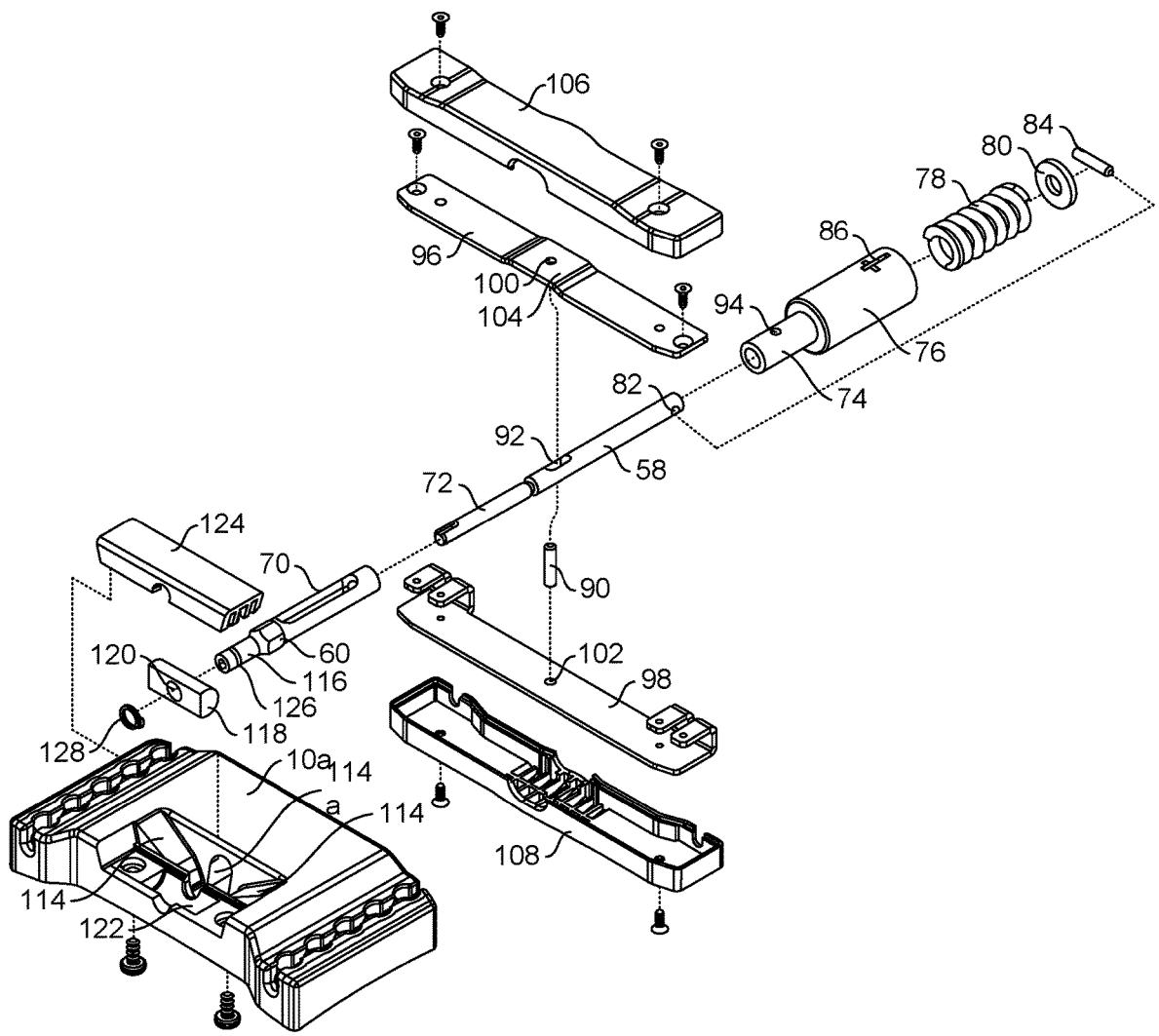
FIG. 5A is an exploded view of a first tensioning block in accordance with an embodiment of the present invention.
Figure 5B:
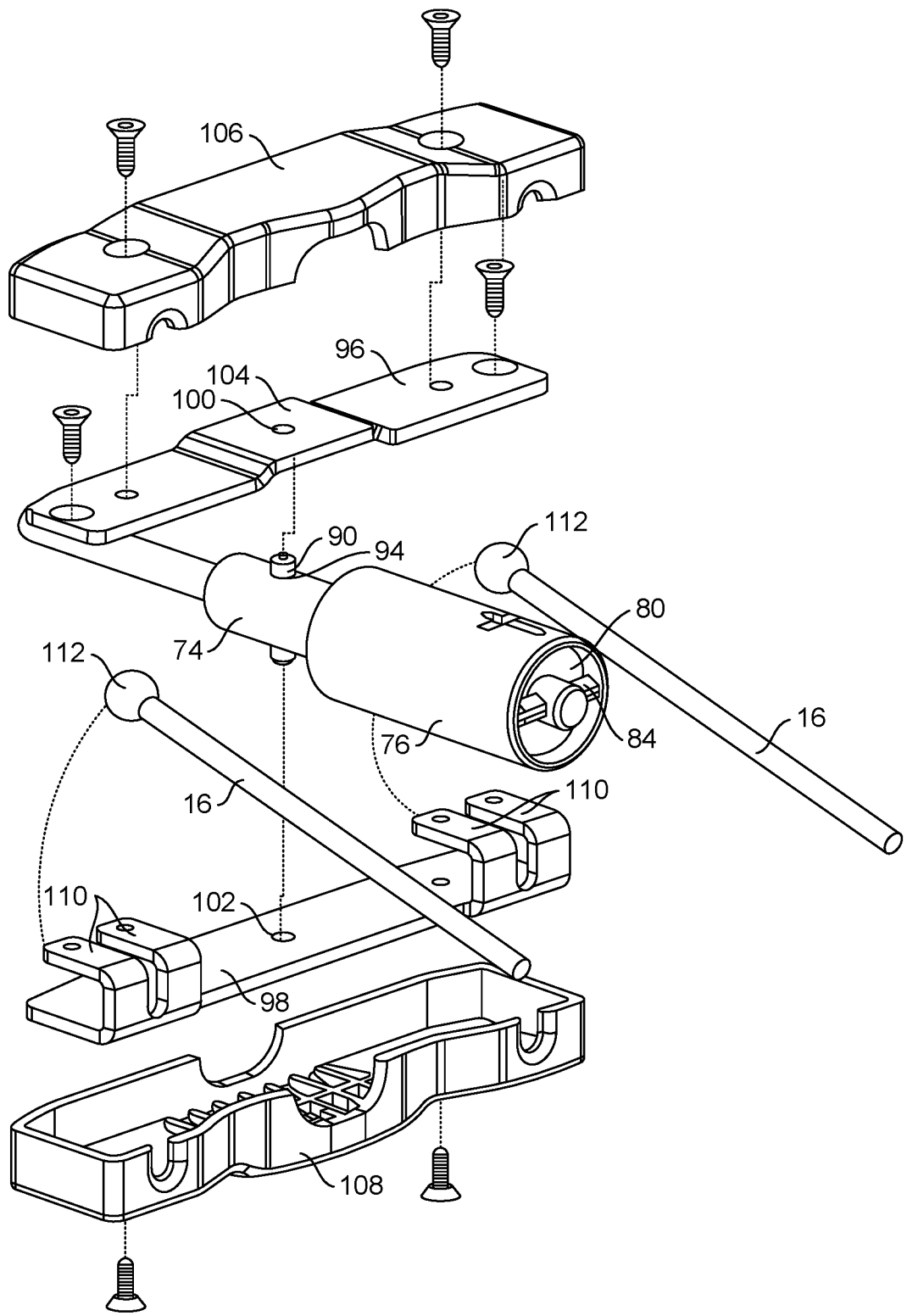
FIG. 5B is an exploded view of a second tensioning block in accordance with an embodiment of the present invention.

FIGS. 5A and 5B are exploded views illustrating example implementations of the tensioning blocks 10a, 10b. Referring specifically to FIG. 5A, the nut 60 may be fastened to an internally threaded shaft 70. In the illustrated embodiment, the internally threaded shaft 70 has a slot along its length, though this may be omitted in other embodiments. The tensioning rod 58 may include a threaded portion 72 sized to insert within the threaded shaft 70 such that rotation of the nut 60 and threaded shaft 70 in one direction can draw the threaded portion 72 into the internally threaded shaft 70.

The indicator block 62 may include an inner cylinder 74 and an outer cylinder 76. The inner cylinder 74 has a smaller outer diameter than the outer cylinder 76 in the illustrated embodiment and is positioned at least partially within the tensioning block 10b, whereas the outer cylinder 76 is completely external to the tensioning block 10b. A spring 78 may be positioned within the outer cylinder 76. The tensioning rod 58 passes through the cylinders 74, 76 and spring 78 and may be retained such that retraction of the tensioning rod 58 results in compression of the spring 78 against the transition between the outer cylinder 76 and the inner cylinder 74. In the illustrated embodiment, the tensing rod 58 passes through a washer 80 and includes an opening 82 that receives a pin 84 preventing the tensioning rod 58 from sliding back through the washer 80.

The outer cylinder 76 may include an indicator window 86. In the illustrated embodiment, the window 86 includes a first slot that is parallel to the axis of symmetry of the cylinder 76 and a second slot that is perpendicular to the first slot. The second slot may be positioned such that when the washer 80 is aligned, i.e. visible through, the second slot, the tension exerted by the tensioning blocks 10a, 10b is at or above a minimum safe tension. The washer 80 may be coated with a distinctive color, e.g., green, to facilitate recognition. The spring 78 may be coated with a different color than the washer 80, e.g. red, such that when this color is visible in the second slot it can be determined that the minimum safe tension has not been achieved.

In the illustrated embodiment, a pin 90 is used to retain one or both of the tensioning rod 58 and the inner cylinder 74 to the tensioning block 10b. In the illustrated embodiment, the tensioning rod 58 includes a slot 92 with straight portions substantially (e.g., within 5 degrees of) parallel to the long dimension of the tensioning rod 58. The length of the slot 92 may be selected such that the tensioning rod 58 has a range of motion relative to the tensioning block 10a, such as between 1 and 5 cm. The range of motion may correspond to an amount of motion required to achieve the minimum safe tension. The pin 90 may further serve to resist rotation of the tensioning rod 58 when the nut 60 is rotated.

The inner cylinder 74 may include an opening 94 through which the pin 90 may also pass when inserted through the opening 92. The inner cylinder 74 may be relatively fixed (e.g., less than 1 mm and less than 5 degrees of play) by the pin 90 passing through the opening 94.

The tensioning block 10b may be formed by an upper plate 96 and a lower plate 98 with the tensioning rod and inner cylinder 74 positioned between the plates 96, 98. The upper plate 96 may define an opening 100 and the lower plate 98 may define an opening 102 such that the pin 90 may be inserted through the openings 100, 102 as well as the openings 92, 94. One or both of the plates 96, 98 may include an offset portion 104 providing clearance for the inner cylinder 74.

In some embodiments, the plates 96, 98 are made of metal and may be encased in an upper cover plate 106 and a lower cover plate 108 made of plastic, such as any of the materials described above with respect to the mounting block 10. The plates 96, 98 may secure to one another by means of screws or other fasteners and the cover plates 106a, 108 may secure to the plates 96, 98 with the same fastener or separate fasteners.

Referring to FIG. 5B while still referring to FIG. 5A, one or both of the plates 96, 98 may define structures for securing to one or more tensioners 16. In the illustrated embodiment, the lower plate 98 includes pairs of hooks 110. Balls 112 or other widened structures secured to the tensioner 16 may seat within the hooks 110 of a pair with the tensioner 16 passing between the hooks of the pair. In this manner, the hooks 110 resist removal of the balls 112 responsive to circumferential tension on the tensioners 16.

Referring again to FIG. 5A, the tensioning block 10a may include an access recess 114 positioned around the nut 60, such as in the form of a pair of sloped surfaces 114 sloping down to positions below that of the nut 60 when assembled. The access recess 114 may provide clearance for a wrench to both be positioned around the nut 60 and rotate through some range of motion, e.g., at least 45 to 120 degrees. The access recess 114 may be positioned adjacent a recess 114a passing through the tensioning block 10a, the internally threaded portion 70 being located within the recess 114a when assembled.

In some embodiments, a pivot extension 116 secures to the nut 60 on an opposite side of the nut from the internally threaded shaft 70. The pivot extension 116 may pivotally secure to the tensioning block 10a in order to support the nut 60 and facilitate rotation of the nut 60. In the illustrated embodiment, a bushing 118 defines an opening 120 receiving the pivot extension 116. The bushing 118 may be non-symmetrical about the axis of symmetry of the opening, such as a flattened cylinder or flattened oval with the axis of the cylindrical or oval portion being perpendicular to the axis of symmetry of the opening 120. The bushing 118 may be made of a low friction material such as brass, ultrahigh molecular weight (UHMW) polymer, TEFLON, or other suitable material.

The tensioning block 10a may define a seat 122 for receiving the bushing 118. A cover plate 124 may be securable to the tensioning block 10a using fasteners, such as screws, in order to hold the bushing 118 within the seat 122. In some embodiments, the pivot extension 116 defines a groove 126 for receiving a snap ring 128 such that the bushing 118 may be positioned between the snap ring 128 and the nut 60, thereby retaining the bushing 118 with respect to the nut 60.

Figure 5C:
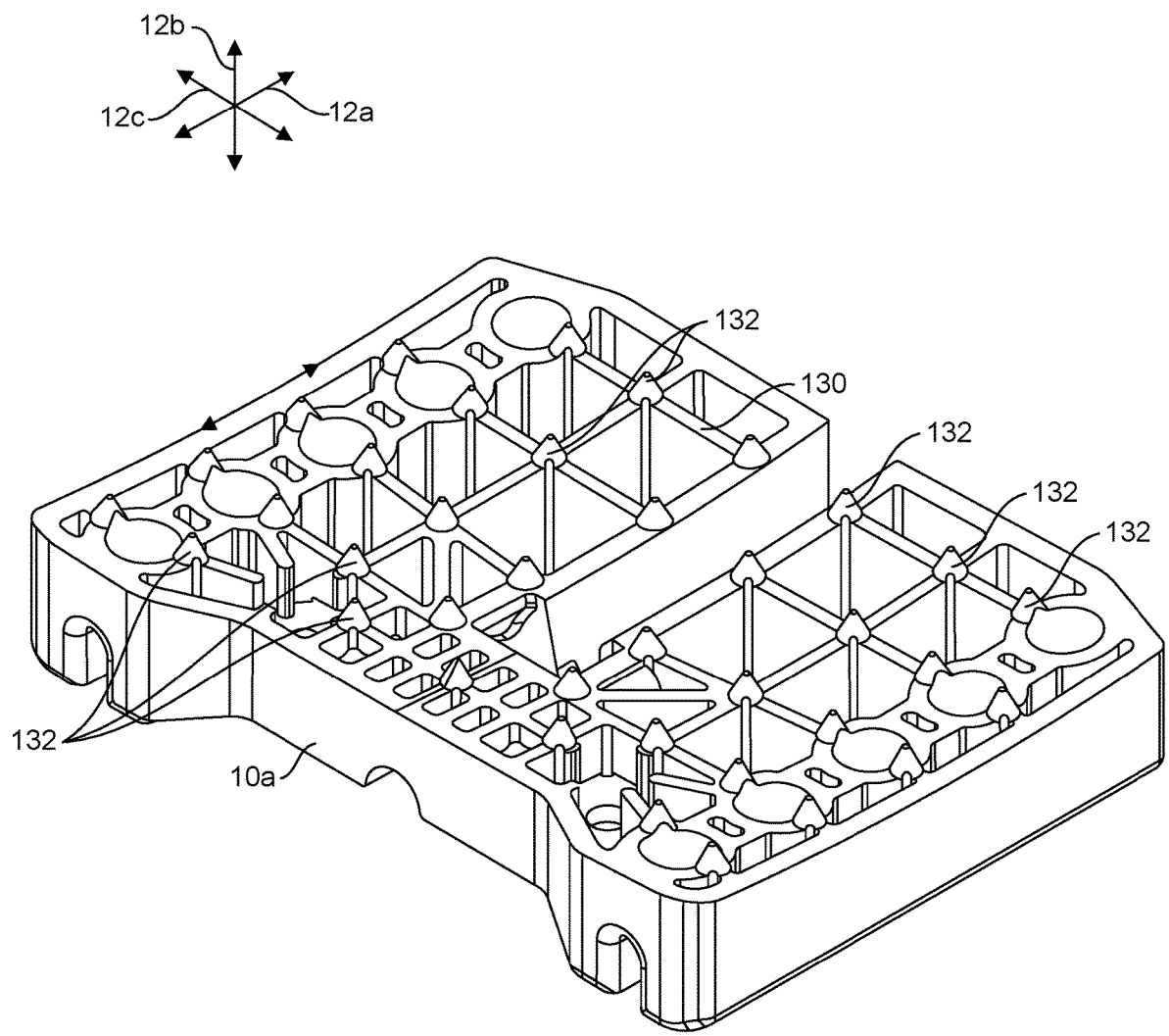
FIG. 5C is an isometric view of the bottom surface of the first tensioning block in accordance with an embodiment of the present invention.

Referring to FIG. 5C, in the illustrated embodiment, the lower surface 130 of the tensioning block 10a may include spikes 132, e.g., conical, pyramidal, or other-shaped spikes, extending downwardly therefrom for engaging the tire 14. The lower surface 130 may be curved in a plane parallel to the radial direction 12b and longitudinal direction 12c. The lower surface 130 may also be curved in a plane such that the circumferential direction 12a lies in the plane and the plane is also parallel to the radial direction 12b in order to conform to the round circumference of the tire. In other embodiments, the lower surface 130 is flat and the force exerted by the tensioners 16 may deform the mounting block 10 to at least partially conform to curvature of the tire 14 with which it is used.

In some embodiments, the lower surface of the tensioning block 10b, e.g., lower surface of lower cover plate 208 lacks spikes and may be either flat or curved in one or more planes as for the tensioning block 10a. During tensioning, the tensioning block 10b may be permitted to slide relative to the tread of the tire whereas the tensioning block 10a is maintained still due to the spikes 132, or moves less than the tensioning block 10b.

Figure 6:
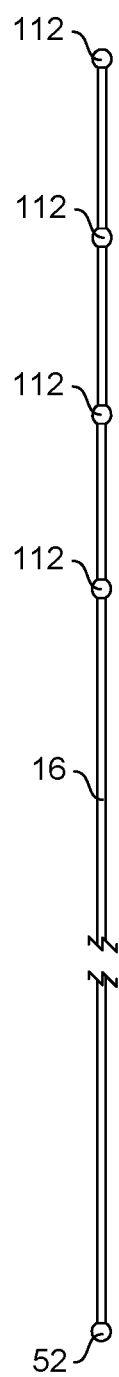
FIG. 6 is a top view of a tensioner in accordance with an embodiment of the present invention.

Referring to FIG. 6, in some embodiments, tires 14 of different circumferences may be accommodated using the illustrated tensioner 16. A ball 52 is secured to one end of the tensioner 16 for engaging the tensioning block 10b. At the other end, a series of balls 112 are secured to the tensioner 16 at substantially uniform (e.g., within 3 mm of uniform) intervals or at non-uniform intervals. The separation between the balls 112 may correspond to the range of adjustability of the tensioning rod 60, which may be constrained by the range of movement of the pin 90 within the slot. For example, the center-to-center distance of the balls 112 may be from 80 to 100 percent of the range of movement of the pin 90 within the slot 92. In other embodiments, the separation is determined by the widened portions 54 in the tensioning block 10a. For example, the center-to-center distance between balls 112 may be between substantially (e.g., within 3 mm) equal to a plate adjustment range, the plate adjustment range being a center-to-center distance of the first widen portion 54 closest to a first side of the tensioning block 10a to a last widened portion 54 closest to a second side of the tensioning block 10a opposite the first side along the circumferential direction. Alternatively, the center-to-center separation between the balls 112 may be between 80 and 100 percent of the plate adjustment range plus the range of movement of the pin 90 within the slot 92.

FIGS. 7A to 7D illustrate an alternative embodiment for tensioning blocks 10a, 10b. The embodiment of FIGS. 7A to 7D may include a single block design that may function as a mounting block 10, a tensioning block 10a, and a tensioning block 10b.

Figure 7A:
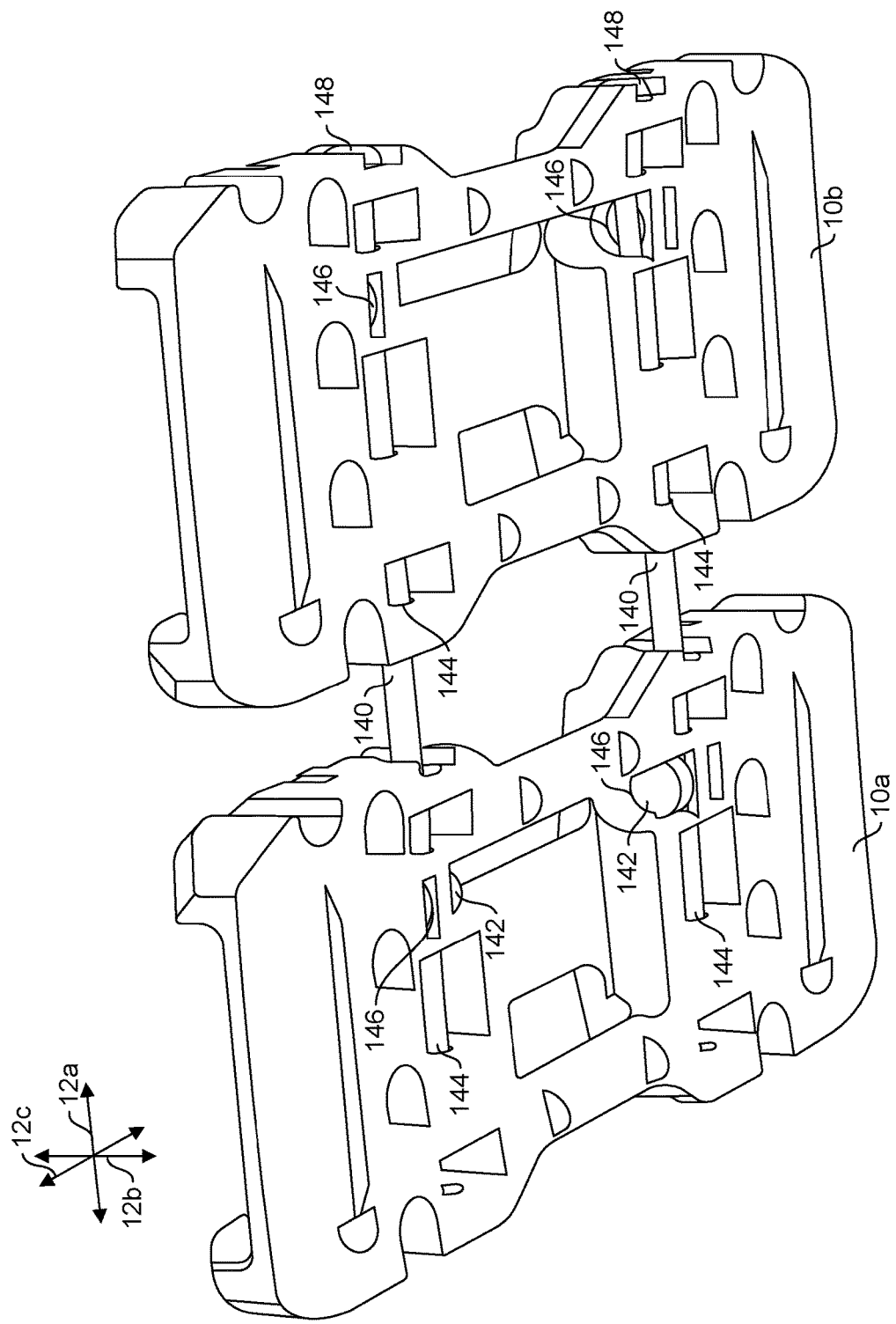
FIG. 7A is a lower isometric view of alternative tensioning blocks in accordance with an embodiment of the present invention.
Figure 7B:
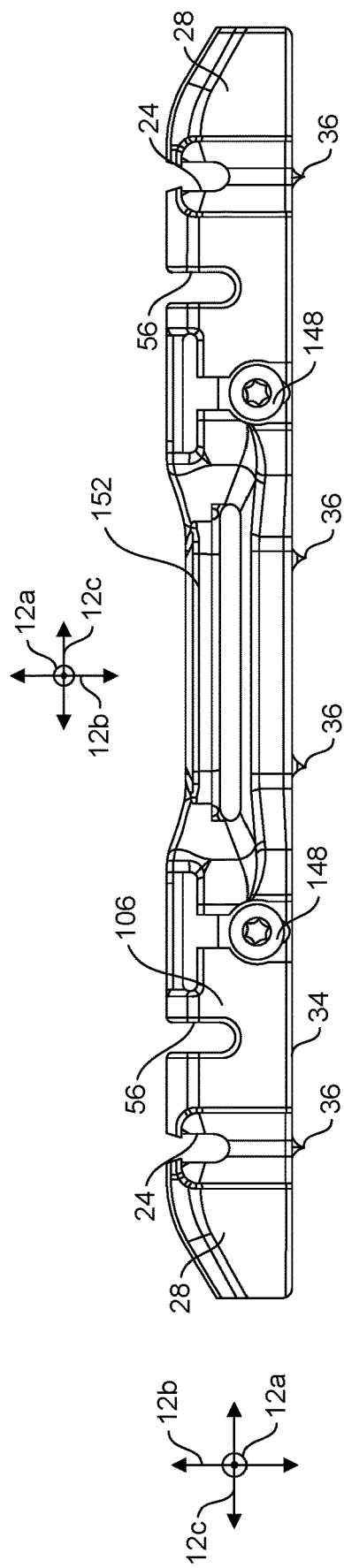
FIG. 7B is a side view of the tensioning block of FIG. 7A.

As shown in FIG. 7A, tensioning may be achieved using one or more screws 140, such as two screws 140, passing through mounting block 10b and at least partially through mounting block 10a. Each screw 140 may engage a nut 142, such as a barrel nut, that is captured within tensioning block 10a such that both rotation of the nut 142 and sliding of the nut 142 in the circumferential direction 12a is hindered by the tensioning block 10a (e.g., no more than 3 mm and 5 degrees of play in any direction). In embodiments where the tensioning blocks 10a, 10b are different instances of the same design, both tensioning blocks 10a, 10b include a through-opening 144 and a cavity 146 for receiving the nut 142. The instance used as the block 10b lacks a nut 142 in the cavity 146. The head 148 of the screw is opposed on one side of the tensioning block 10b and may be turned using a wrench, e.g., hex wrench, in order to cause the screw 140 to advance through the nut 142 in order to draw the tensioning blocks 10a, 10b *toward one another.*

The mounting blocks 10a, 10b may have some or all of the attributes of mounting blocks 10, 10a, 10b described herein, including curvature of the lower surface thereof, the use of spikes 36 on the lower surface, through-openings 30, top openings 32, cable guides 24, recesses 26, ribs 28, and widened portions 54 along a slot 56.

Figure 7C:
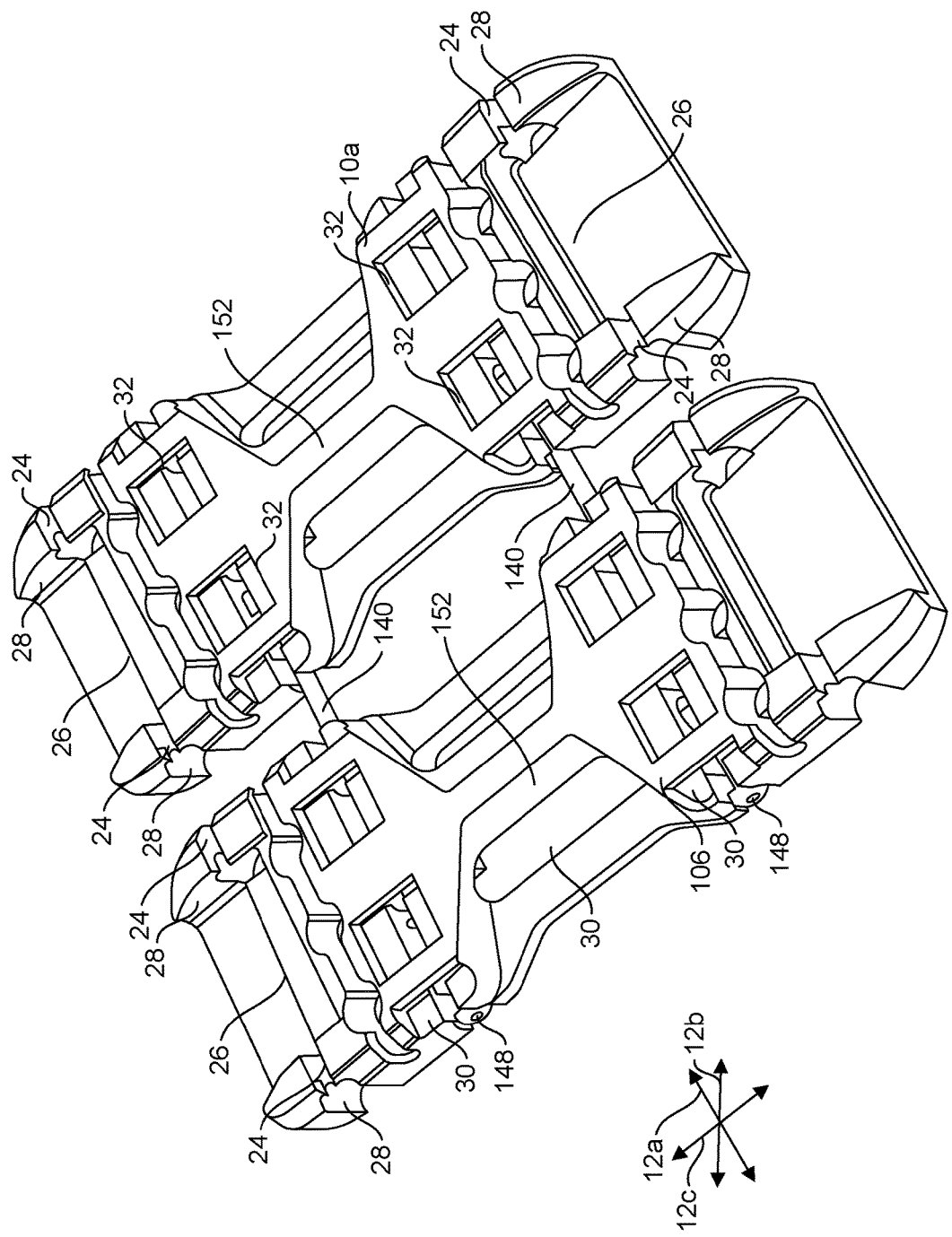
FIG. 7C is an upper isometric view of the tensioning block of FIG. 7C.
Figure 7D:
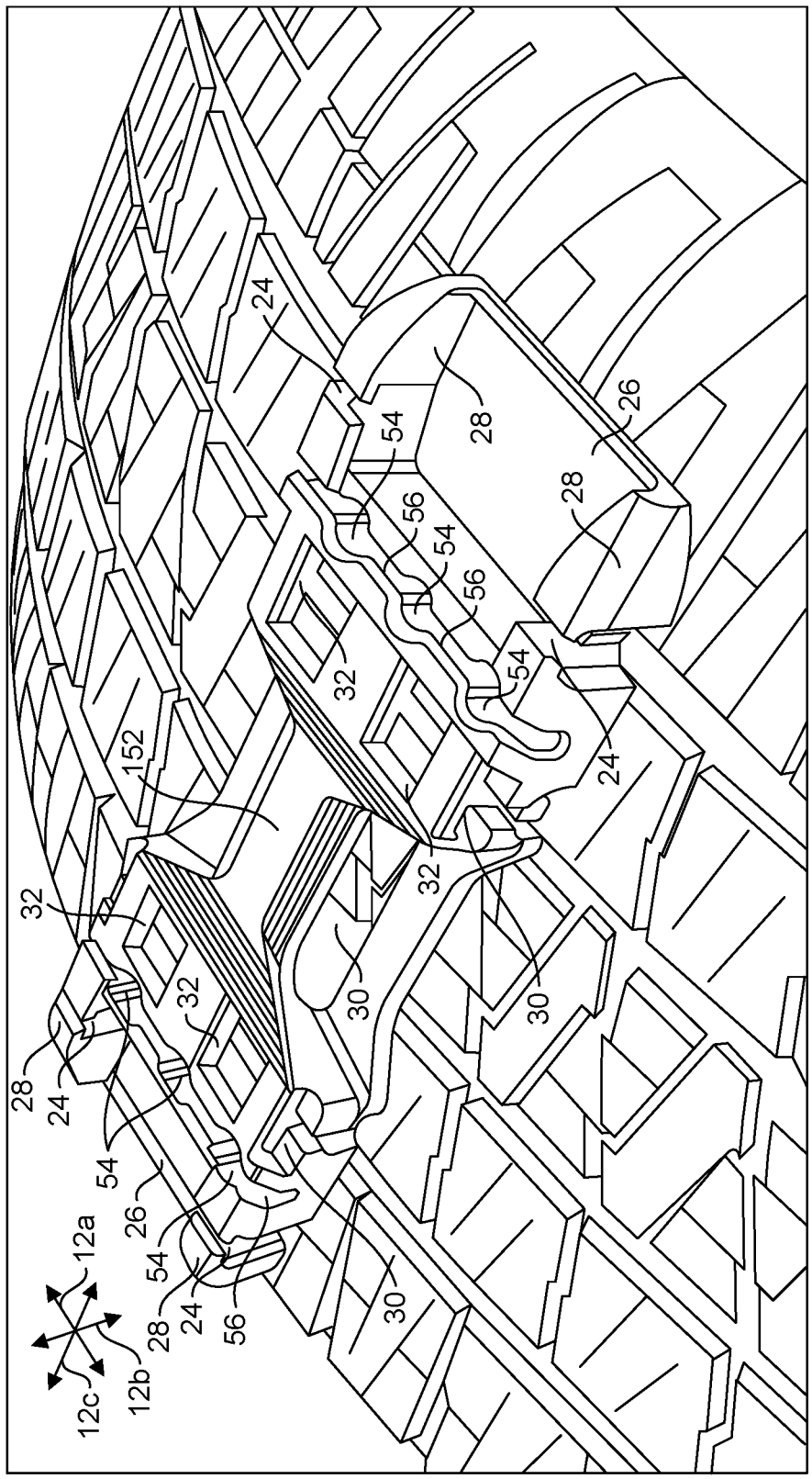
FIG. 7D is an isometric view of the tensioning block of FIG. 7A on a tire.

In particular, as is apparent in FIGS. 7C and 7D, two slots 56 with widened portions 54 are defined one the upper surface of the mounting blocks 10a enabling placement of balls 56 or 112. Accordingly, each tensioning block according to the illustrated design may function as a tensioning block 10a or 10b. The slots 56 and widened portions 54 may be positioned inboard along the longitudinal direction 12a from cable guides 24 and recesses 26 as described above. Accordingly, each mounting block 10a, 10b may also function as a mounting block 10 receiving the tensioner 16 passing thereover and receiving a strap 22 secured within the recess 26.

As is apparent in FIGS. 7C and 7D, an alternative configuration of the upper surface of the mounting blocks 10a, 10b is used. The central opening 30 may be substantially wider, e.g., between 25 and 50 percent of the width of the mounting block 10a, 10b. A single bar 152 may span over the opening 30 and be one or both of both curving and tapering to a narrowed middle portion. Pairs of openings 32 as in the embodiment of FIGS. 2A, 2B, and 2C. In other embodiments, the configuration of the openings 30, 32 is the same as that of FIGS. 2A, 2B, and 2C, with changes in dimension to accommodate the addition of the slots 56 and widened portions 54.

The mounting blocks 10a, 10b of FIGS. 7A to 7D may be made of any of the materials described above with respect to the mounting block 10 of FIGS. 2A, 2B, and 2C.

Figure 8:
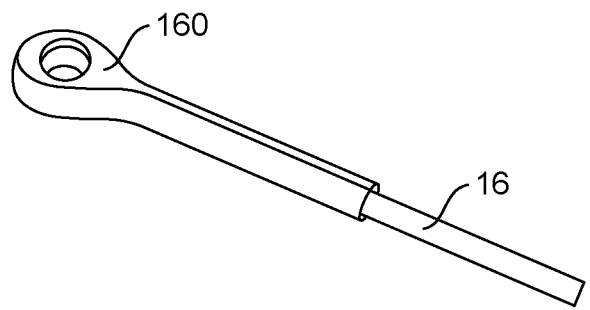
FIG. 8 is an isometric view of an alternative approach for securing a tensioner to a tensioning block in accordance with an embodiment of the present invention.

Referring to FIG. 8, in some embodiments, in place of balls 56 and/or balls 112, securement of the tensioner 16 to either of the tensioning blocks 10a, 10b according to any of the foregoing embodiments, the tensioner 16 may secure to the illustrated eyelet 160 that may then secure to either of the tensioning blocks 10a, 10b by means of screws or other fasteners, sliding over a pin secured to the tensioning block 10a, 10b. The eyelet 160 may be secured to the tensioner 16 by means of swaging, welding, adhesive, screw clamps, or other fastening means.

Figure 9:
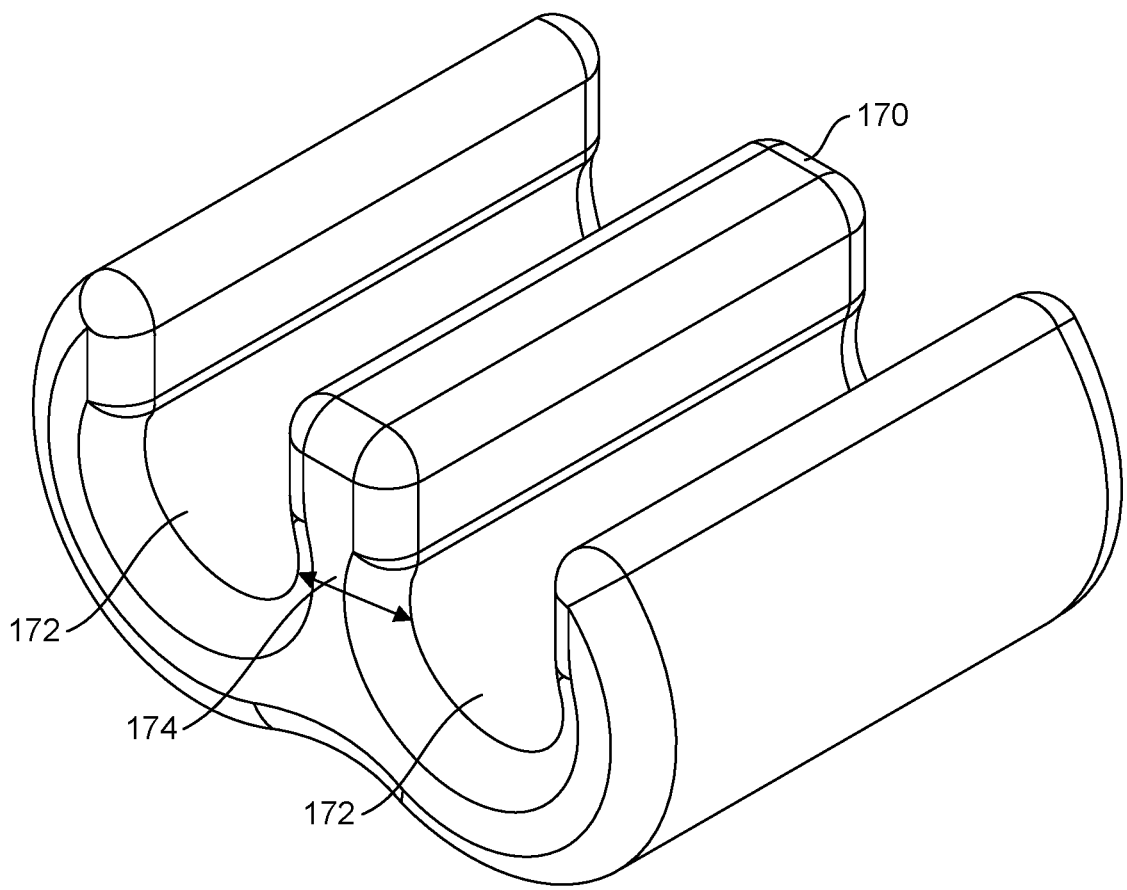
FIG. 9 is an isometric view of a spacer for positioning between mounting blocks and securing extra cable in accordance with an embodiment of the present invention.

Referring to FIG. 9, in some cases, a user may not need many mounting blocks 10. For example, the user may only need to mount a few peripheral packs or is not using the center pouch 20. In such cases, a mounting block 10 may be replaced with a spacer 170. The spacer 170 may serve to raise the one or more tensioners 16 above the tread of the tire. The spacer 170 may include one or more, such as two, cable guides 172 through which the tensioners 16 may pass. As is apparent, the cable guides 172 may be open-ended channels sized to receive the tensioners 16 either freely or with an interference fit.

A separation 174 between the cable guides 172, and thus the tensioners 16 in the cable guides 172, may be selected to maintain the spacer 170 on the tread of the tire 14 and reduce the likelihood of the spacer 170 sliding off the tire 14. For example, the separation 174 may be less than 80 percent, less than 50 percent, or less than 25 percent of the separation of the pairs of cable guides 14 on the mounting blocks 10 with which it is used.

The spacer 170 may also be used to manage free ends of the tensioners 16 embodied as cables. For example, one cable guide 172 may be engaged with the portion of the tensioner 16 spanning between mounting blocks 10. A free end of that tensioner 16 or another tensioner 16 may be placed in the other cable guide 172. The cable guide 172 may be sized such that force is required to insert the free end and a restoring force of the cable guide 172 will hinder removal of the free end.

Figure 10A:
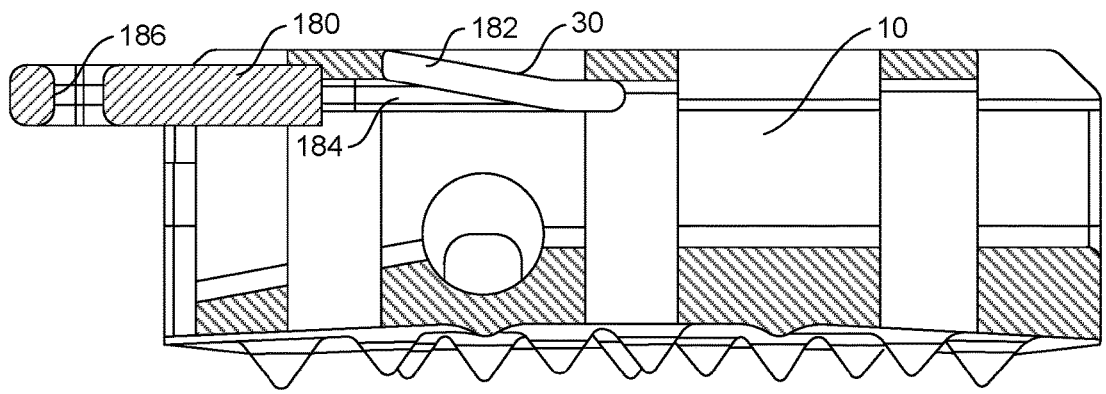
FIG. 10A is a side view illustrating securement of a strap to a mounting block in accordance with an embodiment of the present invention.
Figure 10B:
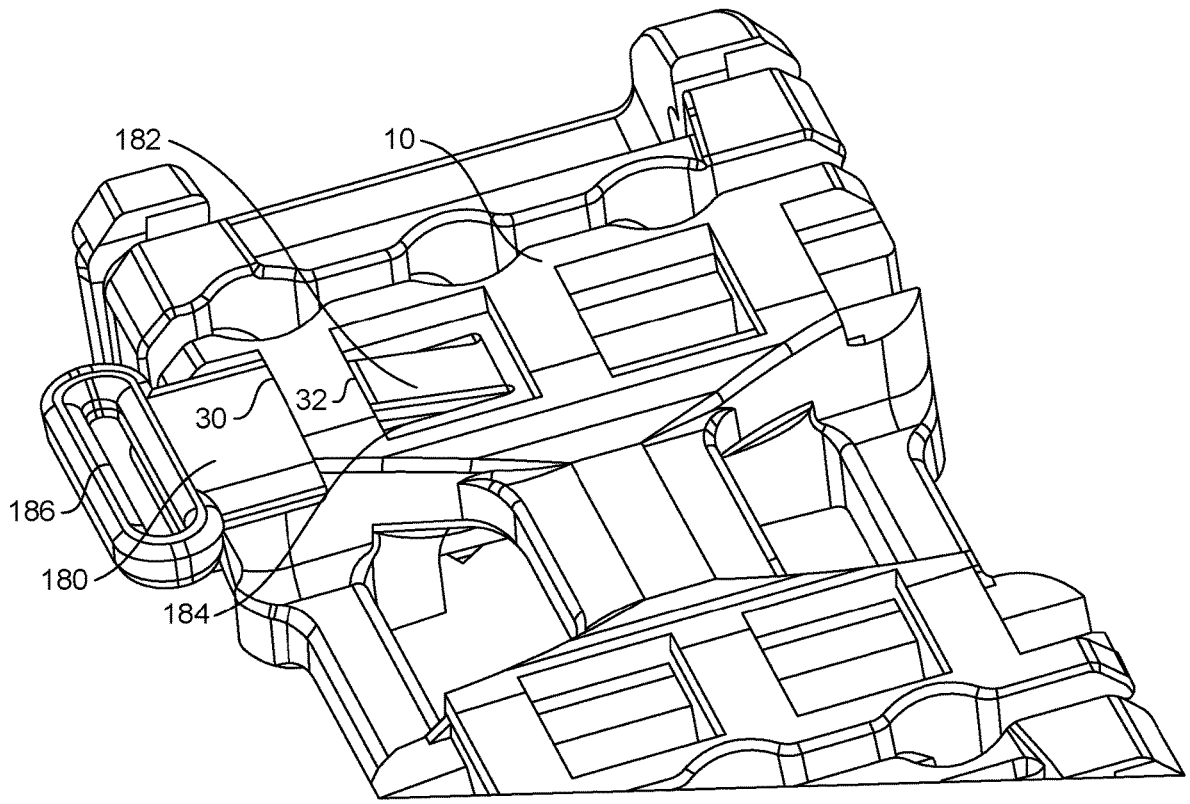
FIG. 10B is an isometric view of the strap secured to the mounting block in accordance with an embodiment of the present invention.

FIGS. 10A and 10B illustrate an example approach for securing items, such as peripheral pouches to mounting blocks 10 according to any of the embodiments disclosed herein. A strap 180 may include a barb 182 that is biased upward from a surface of the strap 180. The barb 182 may be positioned above an opening 184 in the strap 180 such that at least part of the bar 180 is received within the opening 184 when the barb 180 is depressed. The strap 180 and barb 182 may be made of a substantially rigid material, e.g. a Shore A hardness of at least 60, such that the barb 182 resists depression and is biased away from the surface of the strap 180 after being depressed.

In use, the strap 180 may be inserted into the openings 30 with the barb 182 being depressed during insertion and being biased into the opening 32 above the opening 30 following insertion as shown in FIGS. 10A and 10B. To remove, a user may push the barb 182 inwardly and withdraw the strap 180 from the opening 30. A ring 186 or other attachment structure may secure to the strap 180 and be exposed when the strap 180 is secured within the opening 130. The ring 186 or other attachment structure may be used to secure to a perimeter pouch 18 to the mounting block 10 or secure other items to the mounting block 10.

Figure 11A:
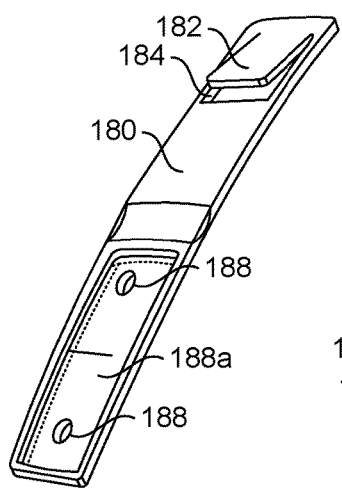
FIGS. 11A to 11C are isometric views illustrating an alternative embodiment for a strap for securing to a mounting block in accordance with an embodiment of the present invention.
Figure 11B:
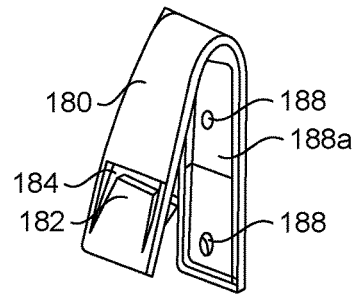
Figure 11C:
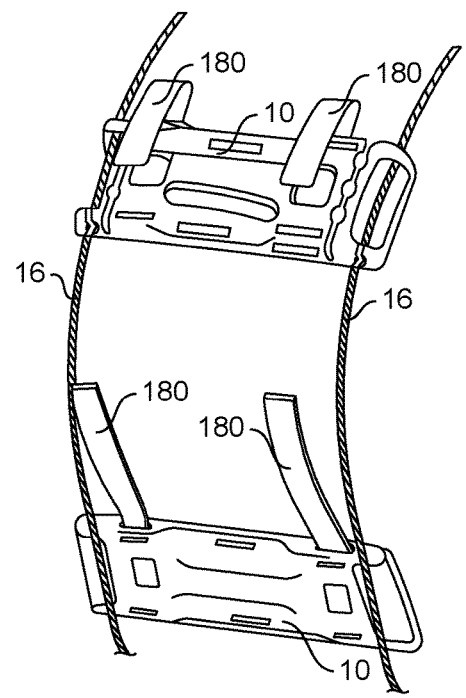

FIGS. 11A to 11C illustrate an alternative approach for securing items to the strap 180. The strap 180 may include one or more openings 188 for fastening the strap 180 to an item, such as a perimeter pouch 18. Fastening may include the use of rivets, screws, or other fasteners passing through the openings 188. In some embodiments, the strap 180 defines a recess 188a or indentation 188a in the region of the strap 480 defining the openings 188. A plate or other structure may be positioned within the recess 188a and secured thereto. As shown in FIG. 11B, during use, the strap 180 may be in a folded configuration. As shown in FIG. 11C there may be multiple straps 180 secure to multiple mounting blocks 10 that may be secured to a single item, such as a single perimeter pouch 18. The straps 180 may be secured to the item before or after the straps 180 are secured to the mounting blocks 10.

Figure 12B:
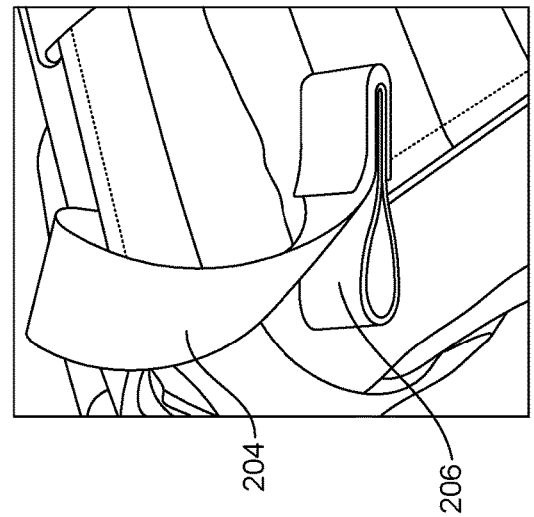
FIGS. 12A to 12E are isometric views of approaches for securing to items in accordance with the prior art that may be used with a mounting block in accordance with an embodiment of the present invention.
Figure 12E:
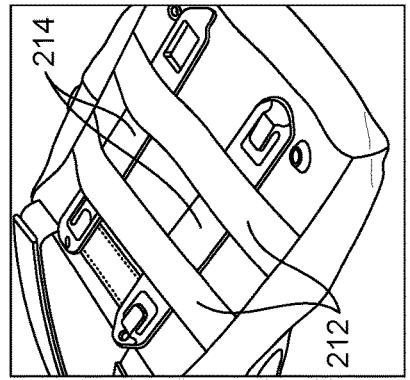
Figure 12D:
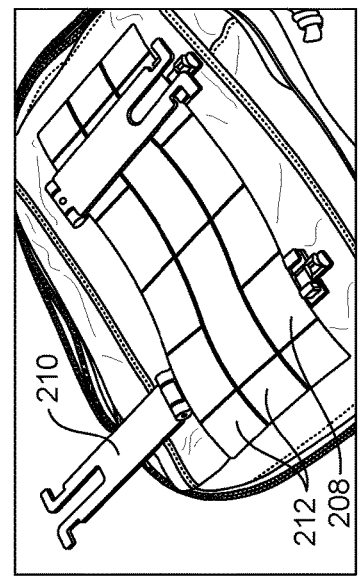
Figure 12A:
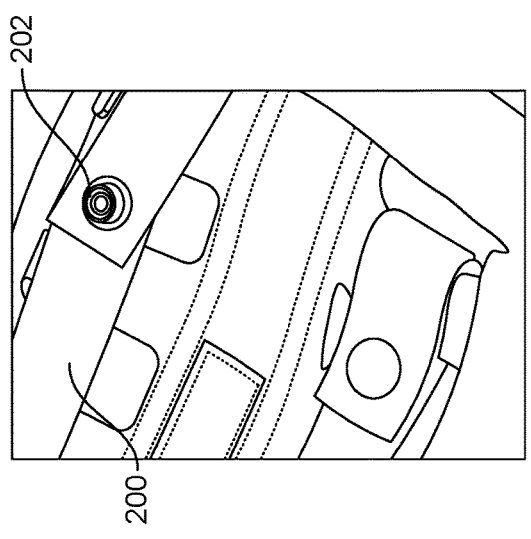

FIGS. 12A to 12E illustrate various structures that may be used to secure perimeter packs 18 to one or more mounting blocks 10. Referring to FIG. 12A, a strap 200 with a first snap fastener portion 202 may be passed through an opening 30, or an opening 30 and an opening 32 and secured to a second snap fastener portion secured to the strap 200 or the perimeter pouch 18. Any type of snap fastener or other type of fastener may be used.

Referring to FIG. 12B, A strap 204 may include an end portion 206 that is folded back and secured to the strap 204 such that it functions as a barb. The strap 204 may be passed through an opening 30, or an opening 30 and an opening 32 and be held in place by the end portion 206 engaging the opening 30 or 32. Alternatively, the strap 204 may be passed under another strap, such as a MOLLE strap and be held therein by the end portion 206.

Figure 12C:
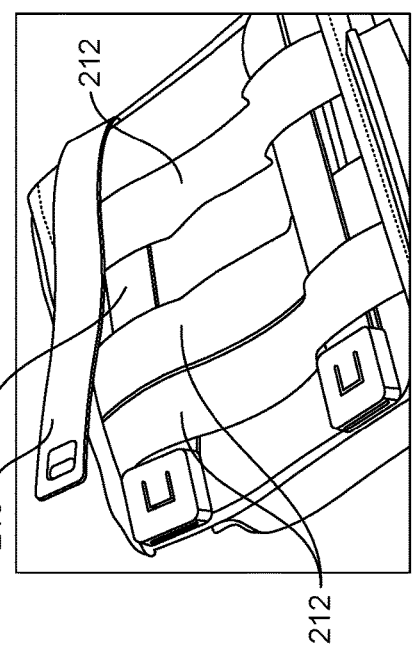

Referring to FIGS. 12C and 12D, in other embodiments, a clip including two legs 208, 210 that are secured to one another at one end and include fastening portions at the other. FIG. 12C illustrates a MALICE clip and 12D illustrate a BLADE TECH MOLLE LOK. One leg 208 may be passed through straps 212 on a perimeter pouch 18, such as MOLLE straps 212. The other leg 210 may be passed through an opening 30 in one or more mounting blocks 10 and the fastening portions of the legs 208, 210 may be secured to one another. There may be two or more clips engaging two or more openings 30 of the same mounting block 10 and secured to the same perimeter pouch 18. FIG. 12E illustrates a BLACKHAWK SPEED CLIP 214 that may also be passed through the openings 30 of one or more mounting blocks 10 in order to secure a perimeter pouch 18 or other item to a mounting block 10. Any approach for securing to MOLLE or PALS straps 212 known in the art may also be used to secure to a mounting block 10.

Figure 13:
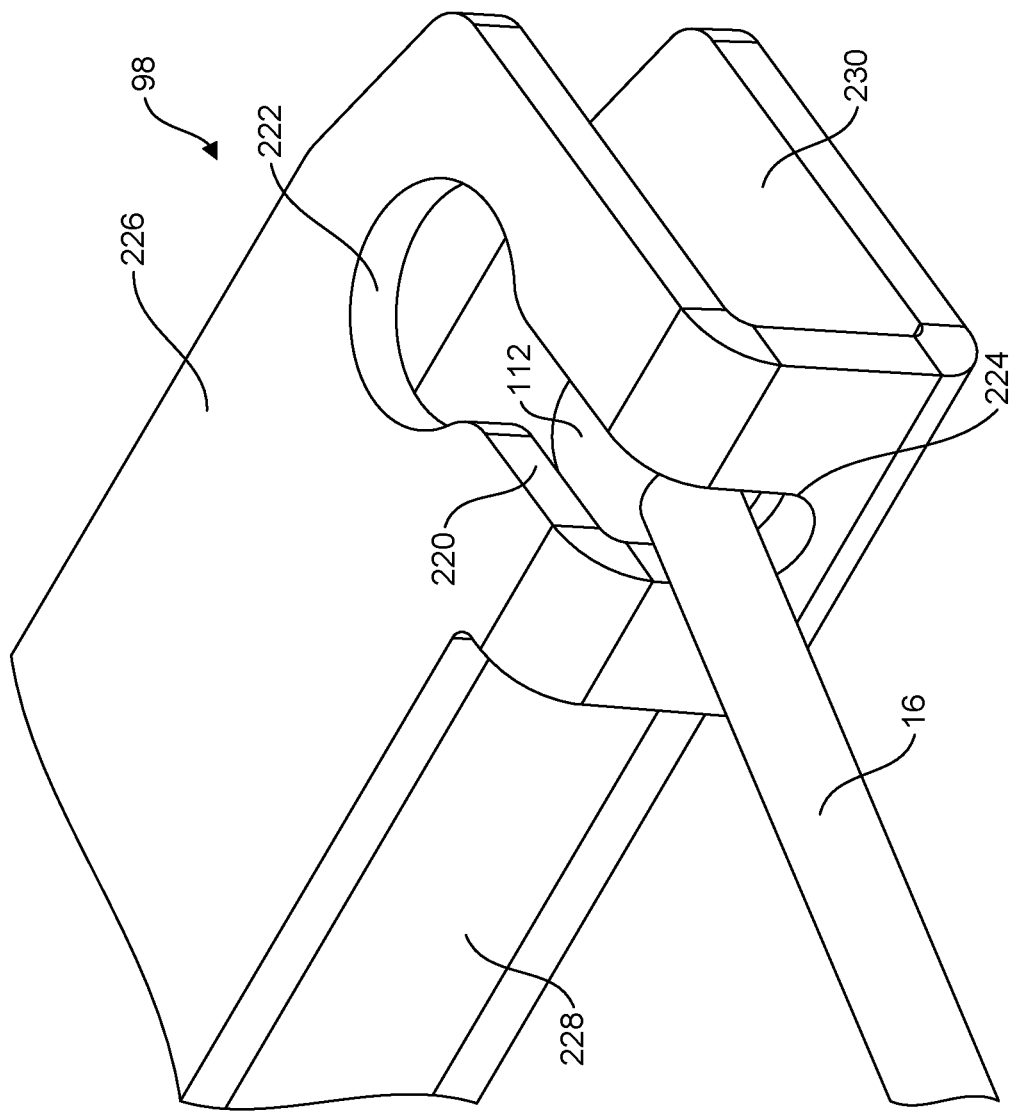
FIG. 13 is an isometric view of an alternative embodiment of a plate for a tensioning block in accordance with an embodiment of the present invention.

Referring to FIG. 13, a tensioning block 10b according to any of the embodiments disclosed herein (e.g., FIG. 1) may incorporate the illustrated plate 98. The plate 98 may include a slot 220 and widened portion 222 such that the widened portion 222 is sized to allow a ball 112 of the tensioner 16 to pass therethrough. The slot 220 may be too narrow to permit the ball 112 to pass therethrough but is wide enough to allow the tensioner 16 to freely pass therethrough.

The plate 98 may include a top portion 226, vertical portion 228, and bottom portion 230 that are each individually flat plates and that are connected together, such as due to being a single plate bent into the illustrated shape, welding, or some other fastening means. The top and bottom portions 226, 230 may be substantially (e.g., within 5 degrees of) parallel to one another whereas the vertical portion 228 is substantially (e.g., within 5 degrees of) perpendicular to the top and bottom portions 226, 230. The top portion 226 may be secured at one edge to the vertical portion 228 and the bottom portion 230 may be secured at one edge to the vertical portion 228 such that the top portion 226 and bottom portion 230 are offset from one another with the vertical portion 228 spanning between the top portion 226 and the bottom portion 230. The widened portion 222 and slot 220 may be formed in the top portion 226. The vertical portion 228 may define a slot 224 that is connected to the slot 220 such that the slot 220 and slot 224 form a continuous slot.

In use, the ball 112 is inserted through the widened portion 220 and the tensioner 16 is tensioned, drawing the ball 112 along the slot 220 until the ball 112 abuts the vertical portion 228 with the tensioner protruding out of the slot 224 as shown. In the illustrated implementation, the vertical portion 228 only extends partially along the top portion 226 and bottom portion 228 on either side of the slot 224. FIG. 13 shows only one side of the plate 98 and there may be another vertical portion 228 (or a continuation of a single vertical portion 228) and corresponding slot 220, widened portion 222, and slot 224 on an opposite side of the plate 98 for receiving another ball 112 and tensioner 16.

Figure 14A:
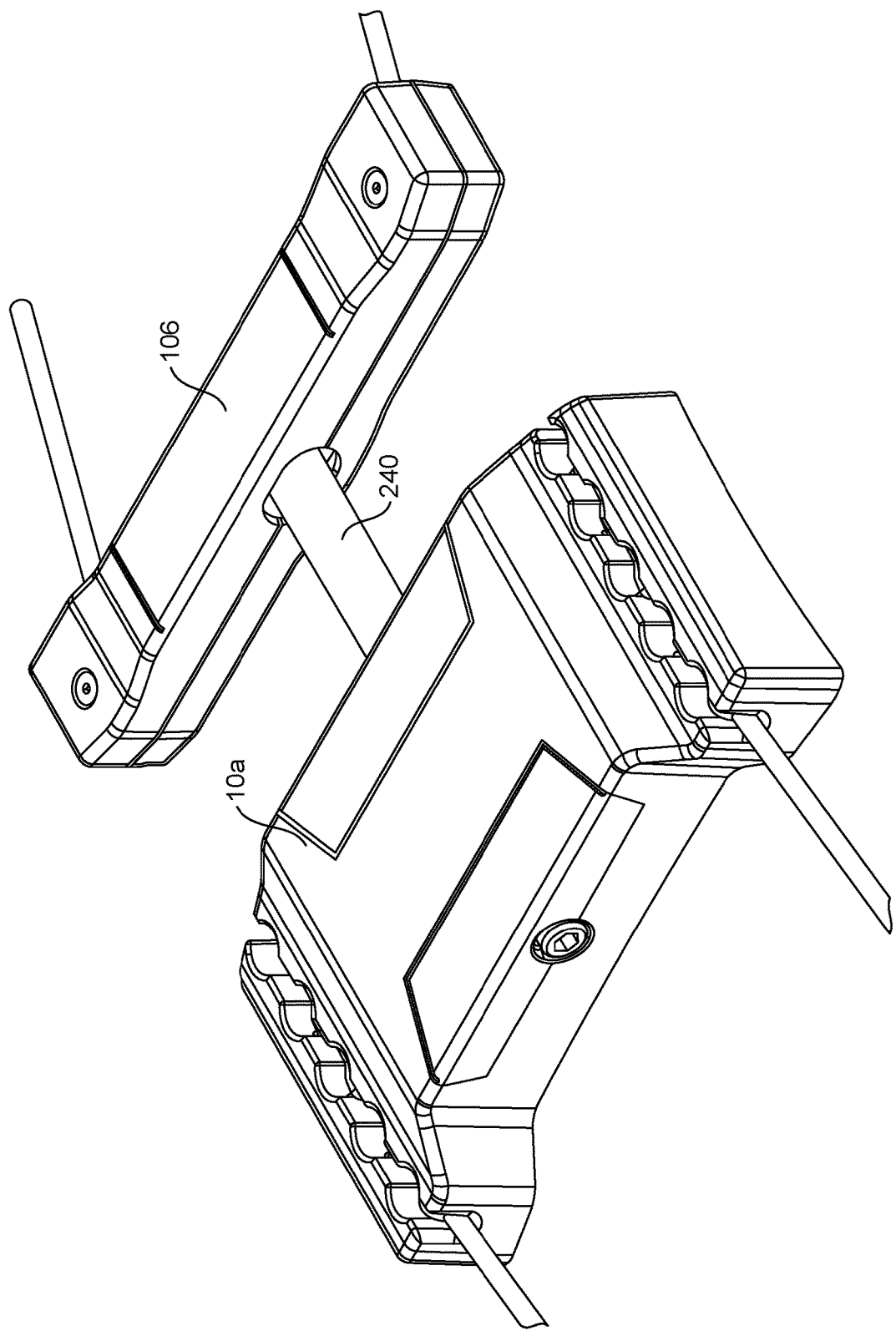
FIG. 14A is an isometric view of alternative tensioning blocks in accordance with an embodiment of the present invention.
Figure 14B:
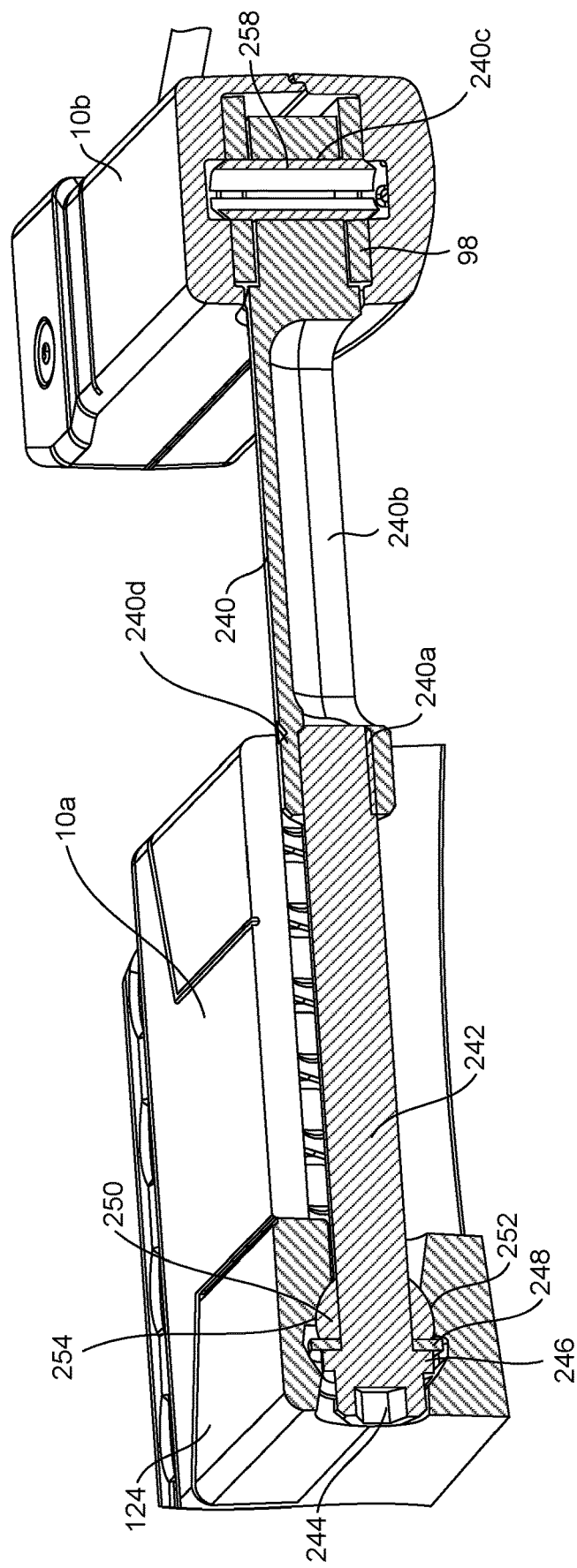
FIG. 14B is a cross-sectional view of the tensioning blocks of FIG. 14A.

FIGS. 14A and 14B illustrate an alternative approach for adjusting the separation between tensioning blocks 10a, 10b. In the illustrated embodiment, a turnbuckle 240 spans between the tensioning blocks 10a, 10b. The turnbuckle 240 may define an internally threaded opening 240a and a hollow portion 240b. A screw 242 passing through tensioning block 10a may engage the threaded opening 240a and pass into the hollow portion 240b. The hollow portion 240b may be open-sided with the opening facing down (toward the tire to which it is secured) during use. Having the opening facing down may hinder the entry of debris into the hollow portion 240b A head 244 of the screw 242 is exposed on a side of the tensioning block 10a, such as a head 244 embodied as an Allen head, hex head, or other type of head. In this manner, the screw 242 may be turned to adjust the position of the screw 242 within the turnbuckle 240, thereby changing the distance between the tensioning blocks 10a, 10b.

In the illustrated embodiment, a flange 246 extends around the head 244 and possibly extends outwardly therefrom. The flange 246 may press against a washer 248. The washer 248 may be made of brass or other material selected for having low friction to facilitate turning of the screw 242. The washer 248 may abut a partially cylindrical stop 250 and the screw 242 may pass through the stop 250. The screw 242 may pass through the stop 250 such that the long axis (axis around which threads are defined) is substantially (e.g., within 5 degrees of) perpendicular to the axis of symmetry of a cylinder to which portions of the substantially cylindrical stop 250 conform. The cylindrical stop 250 may be captured between the tensioning block 10a and a cover 124 fastened to the tensioning block 10a. The tensioning block 10a may define a seat 252 that includes a portion of a cylinder for receiving the cylindrical portion of the stop 250. The cover 124 may likewise include seat 254 including a portion of a cylinder that engages the cylindrical portion of the stop 250.

The turnbuckle 240 may define an opening 240c such that hollow portion 240b is positioned between the opening 240c and the threaded portion 240a. A pin 258 may be passed through the opening 240c and engage the tensioning block 10b in order to secure to the turnbuckle 240. The opening 240c may be substantially (e.g., within 5 degrees of) perpendicular to the long dimension of the turnbuckle 240, e.g., the axis around which threads of the threaded portion 240a are formed. The block 98 may be interposed between the tensioning block 10b and the turnbuckle 240. The pin 258 may also pass through the block 98.

In some embodiments, an exterior mark 240d may be placed on the turnbuckle 240. A distance between the mark 240d and the end of the internally threaded opening 240a along the long dimension of the turnbuckle 240 may be selected such that if the mark 240d is visible outside of the tensioning block 10a, then the turnbuckle is extended too far. The mark 240d may be embodied as a circumferential groove that is partially filled with a durable paint in a highly visible color such as red.

While the preferred embodiments of the invention have been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. An apparatus for securing one or more items to a tire comprising:
   one or more tensioners configured to wrap around a major portion of the tire;
   a first tensioning block configured to secure to the one or more tensioners;
   a second tensioning block configured to secure to the one or more tensioners;
   a tensioning system coupling the first tensioning block to the second tensioning block and configured to adjust a separation between the first tensioning block and the second tensioning block; and
   one or more mounting blocks including one or more guides for receiving a portion of each of the one or more tensioners, the one or more mounting blocks defining one or more openings for fastening the one or more items to the one or more mounting blocks.

2. The apparatus of claim 1, wherein the first tensioning block is configured to be removably secured to the one or more tensioners including one or more cables by engaging a first widened portion secured to each cable of the one or more cables.

3. The apparatus of claim 2, wherein the second tensioning block is non-removably secured to a second widened portion secured to each cable of the one or more cables.

4. The apparatus of claim 1, wherein:
   the one or more tensioners comprise two tensioners;
   the one or more guides of each mounting block of the one or more mounting blocks comprise two guides offset from one another in each mounting block and each configured to engage one of the two tensioners.

5. The apparatus of claim 4, wherein each guide of the two guides comprises one or more grooves defined in each mounting block of the one or more mounting blocks.

6. The apparatus of claim 5, wherein:
the two guides are offset from one another in a first direction; and
each guide of the two guides includes two ribs offset from one another in a second direction perpendicular to the first direction, each rib of the two ribs defining a groove of the one or more grooves.

7. The apparatus of claim 6, wherein at least one guide of the two guides comprises a recess between the two ribs of the at least one guide such that, when a first cable of the one or more cables is positioned within the two guides, a portion of the first cable is suspended within the recesses such that at least one of a strap and a clip is fastenable to the portion of the first cable.

8. The apparatus of claim 1, wherein the tensioning system comprises a nut captured within the first tensioning block and rotatable with respect to the first tensioning block and a threaded shaft secured to the second tensioning block and engaging the nut.

9. The apparatus of claim 8, wherein the threaded shaft is secured to the second tensioning block by an indicator such that change in tension in the threaded shaft causes a visual change in state of the indicator.

10. The apparatus of claim 1, wherein each of the first tensioning block, the second tensioning block, and one or more mounting blocks has a same design.

11. The apparatus of claim 10, wherein the same design includes:
one or more grooves for receiving the one or more tensioners such that the one or more tensioners are slidable along the one or more grooves;
one or more first structures for fastening to the one or more tensioners in addition to the one or more grooves;
one or more second structures for capturing a nut and resist rotation of the nut; and
one or more third structures for rotatably retaining a threaded shaft engaging the nut.

12. The apparatus of claim 1, wherein a lower surface of each of the one or more mounting blocks, the first tensioning block, and the second tensioning block is curved to conform to the tire.

13. The apparatus of claim 1, wherein a lower surface of each of the one or more mounting blocks, the first tensioning block has one or more spikes secured thereto for engaging the tire.

14. An apparatus comprising a mounting block defining:
one or more first grooves;
one or more second grooves offset from the one or more first grooves in a first direction, the one or more first grooves configured to receive a first tensioner and the one or more second grooves configured to receive a second tensioner;
one or more attachment points defined between the one or more first grooves and one or more second grooves and configured to secure an item to the mounting block;
a first slot including one or more first widened portions, the slot being substantially parallel to the one or more first grooves; and
a second slot including one or more second widened portions, the second slot being substantially parallel to the first slot;
wherein the first slot and the second slot are positioned between the first one or more grooves and the second one or more grooves.

15. An apparatus comprising a mounting block defining:
one or more first grooves;
one or more second grooves offset from the one or more first grooves in a first direction, the one or more first grooves configured to receive a first tensioner and the one or more second grooves configured to receive a second tensioner;
one or more attachment points defined between the one or more first grooves and one or more second grooves and configured to secure an item to the mounting block;
one or more through openings extending therethrough in a second direction perpendicular to the first direction; and
one or more cavities, each cavity of the one or more cavities being sized to receive a barrel nut and being intersected by one of the one or more through openings.

16. An apparatus comprising:
a mounting block defining:
one or more first grooves;
one or more second grooves offset from the one or more first grooves in a first direction, the one or more first grooves configured to receive a first tensioner and the one or more second grooves configured to receive a second tensioner; and
one or more attachment points defined between the one or more first grooves and one or more second grooves and configured to secure an item to the mounting block;
wherein a lower surface of the mounting block is curved to conform to a tire and defines a plurality of spikes.

17. A method comprising:
securing at least one mounting block around a tread of a tire with a tensioner extending around the circumference of the tire with at least a portion of the at least one mounting block being positioned between the tensioner and the tire, the block having an opening or recess to receive the tensioner and routing the tensioner through the opening or recess;
providing an item including a plurality of straps;
securing each strap of the plurality of straps to either of (a) the tensioner such that each strap engages a portion of the tensioner and (b) a structure other than the tensioner that is secured to or part of the at least one mounting; and
securing the item with the straps to a face of the tire, the straps extending in a direction transverse from the tensioner.

18. The method of claim 17, further comprising:
wherein the at least one mounting block defines a pair of ribs each defining a groove and a recess between the pair of ribs;
wherein securing each strap of the plurality of straps to the tensioner comprises securing each strap between the pair of ribs of one of the mounting blocks of the plurality of mounting blocks.

19. An apparatus for securing one or more items to a spare tire having a tread around a circumference, a first face, and a second face, the apparatus comprising:
a tensioner configured to wrap around the circumference of the tire;
a first mount block configured to secure to the tensioner with the tensioner compressing the mount block against the tire tread, the mount block including a structure for receiving a securement member;

a first securement member secured to the first mount block, the first securement member being an elongated member extending transverse to the circumference of the tire; and a carrier member configured to be positioned on the first face of the tire and being secured to the first securement member.

20. The apparatus of claim 19, further comprising a second mount block configured to secure to the tensioner with the tensioner compressing the second mount block against the tire tread spaced from the first mount block and a second securement member secured to the second mount block and extending transverse to the circumference of the tire.

21. The apparatus of claim 20, wherein the a carrier member is configured to be positioned on the first face of the tire and being secured to the first and second securement members.

22. The apparatus of claim 21, wherein the carrier member is a bag.

23. The apparatus of claim 19, wherein the first mount block includes a plurality of traction members on a side thereof facing the tire tread.

24. The apparatus of claim 23, wherein the traction members are teeth extending towards the tire tread.

25. An apparatus for securing one or more items to a spare tire having a tread around a circumference, a first face, and a second face, the apparatus comprising:

a tensioner configured to wrap around the circumference of the tire;

a first mount block configured to secure to the tensioner with the tensioner compressing the mount block against the tire tread, the mount block including a structure for receiving a securement member; and a first securement member secured to the first mount block, the first securement member being an elongated member extending transverse to the circumference of the tire;

wherein the mount block includes a rod extending substantially parallel to the circumference of the tire, the first securement member being secured to the rod.

26. An apparatus for securing one or more items to a spare tire having a tread around a circumference, a first face, and a second face, the apparatus comprising:

a tensioner configured to wrap around the circumference of the tire;

a first mount block configured to secure to the tensioner with the tensioner compressing the mount block against the tire tread, the mount block including a structure for receiving a securement member; and a first securement member secured to the first mount block, the first securement member being an elongated member extending transverse to the circumference of the tire;

wherein the first securement member is an adjustable strap.

27. An apparatus for securing one or more items to a spare tire having a tread around a circumference, a first face, and a second face, the apparatus comprising:

a tensioner configured to wrap around the circumference of the tire;

a first mount block configured to secure to the tensioner with the tensioner compressing the mount block against the tire tread, the mount block including a structure for receiving a securement member; and a first securement member secured to the first mount block, the first securement member being an elongated member extending transverse to the circumference of the tire;

wherein the first mount block includes openings in sides thereof to receive the tensioning member therethrough for securement to the tire.

* * * * *